US011742997B2

(12) United States Patent
Oizumi et al.

(10) Patent No.: US 11,742,997 B2
(45) Date of Patent: *Aug. 29, 2023

(54) COMMUNICATION APPARATUS AND BUFFER PARTITIONING METHOD

(71) Applicant: Sun Patent Trust, New York, NY (US)

(72) Inventors: Toru Oizumi, Kanagawa (JP); Ayako Horiuchi, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,949

(22) Filed: May 31, 2022

(65) Prior Publication Data

US 2022/0294577 A1    Sep. 15, 2022

Related U.S. Application Data

(63) Continuation of application No. 16/931,020, filed on Jul. 16, 2020, now Pat. No. 11,381,353, which is a (Continued)

(30) Foreign Application Priority Data

Jul. 18, 2012  (JP) ................................ 2012-159759

(51) Int. Cl.
*H04L 1/1829*       (2023.01)
*H04W 72/21*        (2023.01)
(Continued)

(52) U.S. Cl.
CPC .......... *H04L 1/1861* (2013.01); *H04L 1/1812* (2013.01); *H04L 1/1835* (2013.01); (Continued)

(58) Field of Classification Search
CPC .... H04L 1/1861; H04L 5/0055; H04W 72/02; H04W 76/27; H04W 72/0413; H04W 72/042; H04W 72/0446
See application file for complete search history.

(56) References Cited

U.S. PATENT DOCUMENTS 8,934,424 B2 *  1/2015  Yin ................... H04W 72/0446
                                                   370/329
9,036,491 B2 *  5/2015  Yin ....................... H04W 72/52
                                                   370/252
(Continued)

OTHER PUBLICATIONS

3GPP TS 36.211 V10.1.0, "3rd Generation Partnership Project; Technichal Specification Group Radio Access Network; Evolved Universal Terrestrial Radio Access (E-UTRA); Physical Channels and Modulation (Release 10)," Mar. 2011, 103 pages.
(Continued)

*Primary Examiner* — Ajay Cattungal
(74) *Attorney, Agent, or Firm* — Seed IP Law Group LLP

(57) ABSTRACT

Provided is a terminal device with which deterioration in hybrid automatic repeat request (HARQ) retransmission performance can be inhibited by continuing a downlink (DL) HARQ process for DL data before and after changing the uplink link-DL configuration. In this device, a decoder stores, in a retransmission buffer, DL data transmitted from a base station, and decodes the DL data, and a wireless transmitter transmits a response signal generated using a DL-data-error detection result. A soft buffer is partitioned into a plurality of regions for each retransmission process on the basis of the highest values among retransmission process numbers respectively stated in a plurality of configuration patterns which can be set in the terminal.

13 Claims, 17 Drawing Sheets

Related U.S. Application Data continuation of application No. 16/515,384, filed on Jul. 18, 2019, now Pat. No. 10,756,856, which is a continuation of application No. 15/961,660, filed on Apr. 24, 2018, now Pat. No. 10,404,419, which is a continuation of application No. 15/674,398, filed on Aug. 10, 2017, now Pat. No. 9,985,753, which is a continuation of application No. 15/390,039, filed on Dec. 23, 2016, now Pat. No. 9,768,919, which is a continuation of application No. 14/413,216, filed as application No. PCT/JP2013/003644 on Jun. 11, 2013, now Pat. No. 9,564,998.

(51) Int. Cl.

| | | |
|---|---|---|
| *H04W 72/23* | (2023.01) | |
| *H04L 1/1812* | (2023.01) | |
| *H04L 1/1867* | (2023.01) | |
| *H04W 72/02* | (2009.01) | |
| *H04W 76/27* | (2018.01) | |
| *H04L 5/00* | (2006.01) | |
| *H04W 72/0446* | (2023.01) | |

(52) U.S. Cl.
CPC .......... *H04L 1/1893* (2013.01); *H04L 5/0055* (2013.01); *H04W 72/02* (2013.01); *H04W 72/0446* (2013.01); *H04W 72/21* (2023.01); *H04W 72/23* (2023.01); *H04W 76/27* (2018.02); *H04L 1/1819* (2013.01)

(56) References Cited

U.S. PATENT DOCUMENTS

| | | | | |
|---|---|---|---|---|
| 9,564,998 | B2* | 2/2017 | Oizumi | H04L 1/1812 |
| 9,768,919 | B2* | 9/2017 | Oizumi | H04L 1/1835 |
| 9,985,753 | B2* | 5/2018 | Oizumi | H04L 1/1893 |
| 10,404,419 | B2* | 9/2019 | Oizumi | H04L 1/1812 |
| 10,756,856 | B2* | 8/2020 | Oizumi | H04W 72/02 |
| 11,381,353 | B2* | 7/2022 | Oizumi | H04W 72/21 |
| 2011/0035639 | A1* | 2/2011 | Earnshaw | H04L 1/1812 |
| | | | | 714/E11.131 |
| 2013/0051289 | A1* | 2/2013 | Hsieh | H04L 1/1845 |
| | | | | 370/280 |
| 2013/0242816 | A1* | 9/2013 | He | H04L 5/001 |
| | | | | 370/280 |
| 2014/0029484 | A1* | 1/2014 | Choi | H04L 5/1469 |
| | | | | 370/280 |
| 2014/0086116 | A1* | 3/2014 | Seo | H04J 3/1694 |
| | | | | 370/280 |
| 2014/0192688 | A1* | 7/2014 | Yang | H04L 5/0055 |
| | | | | 370/280 |
| 2015/0016376 | A1* | 1/2015 | Seo | H04L 5/0048 |
| | | | | 370/329 |
| 2015/0055518 | A1* | 2/2015 | Park | H04L 5/14 |
| | | | | 370/280 |
| 2015/0103705 | A1* | 4/2015 | Yang | H04L 27/2626 |
| | | | | 370/280 |

OTHER PUBLICATIONS

3GPP TS 36.212 V10.1.0, "3rd Generation Partnership Project; Technichal Specification Group Radio Access Network; Evolved Universal Terrestrial Radio Access (E-UTRA); Multiplexing and channel coding (Release 10)," Mar. 2011, 76 pages.

3GPP TS 36.212 V10.6.0, "3rd Generation Partnership Project; Technichal Specification Group Radio Access Network; Evolved Universal Terrestrial Radio Access (E-UTRA); Multiplexing and channel coding (Release 10)," Jun. 2012, p. 17.

3GPP TS 36.213 V10.1.0, "3rd Generation Partnership Project; Technichal Specification Group Radio Access Network; Evolved Universal Terrestrial Radio Access (E-UTRA); Physical layer procedures (Release 10)," Mar. 2011, 115 pages.

CATT, CMCC, "Optimization of soft buffer allocation for TDD," R1-094120, 3GPP TSG RAN WG1 meeting #58bis, Agenda Item: 6.2, Miyazaki, Japan, Oct. 12-16, 2009, 4 pages.

Extended European Search Report dated Jun. 25, 2015, for corresponding EP Application No. 13820524.0-1851 / 2876928, 10 pages.

International Search Report dated Sep. 3, 2013, for corresponding International Application No. PCT/JP2013/003644, 3 pages. (W/ English Translation).

LG Electronics, "TDD DL-UL Reconfiguration Methods for eIMTA," R1-122318, 3GPP TSG RAN WG1 Meeting #69, Agenda Item: 7.10.3, Prague, Czech Republic, May 21-25, 2012, 5 pages.

Nakao et al., "Performance enhancement of E-UTRA uplink control channel in fast fading environments," IEEE 69th Vehicular Technology Conference, VTC Spring 2009, 5 pages.

Qualcomm Incorporated, "Soft buffer partitioning for CA," R1-110331, 3GPP TSG-RAN WG1 #63bis, Agenda Item: 6.2.1, Dublin, Ireland, Jan. 17-21, 2011, 6 pages.

* cited by examiner

| UL-DL Config | MAXIMUM NUMBER OF DL HARQ PROCESSES $M_{DL\ HARQ}$ |
|---|---|
| 0 | 4 |
| 1 | 7 |
| 2 | 10 |
| 3 | 9 |
| 4 | 12 |
| 5 | 15 |
| 6 | 6 |

FIG. 5

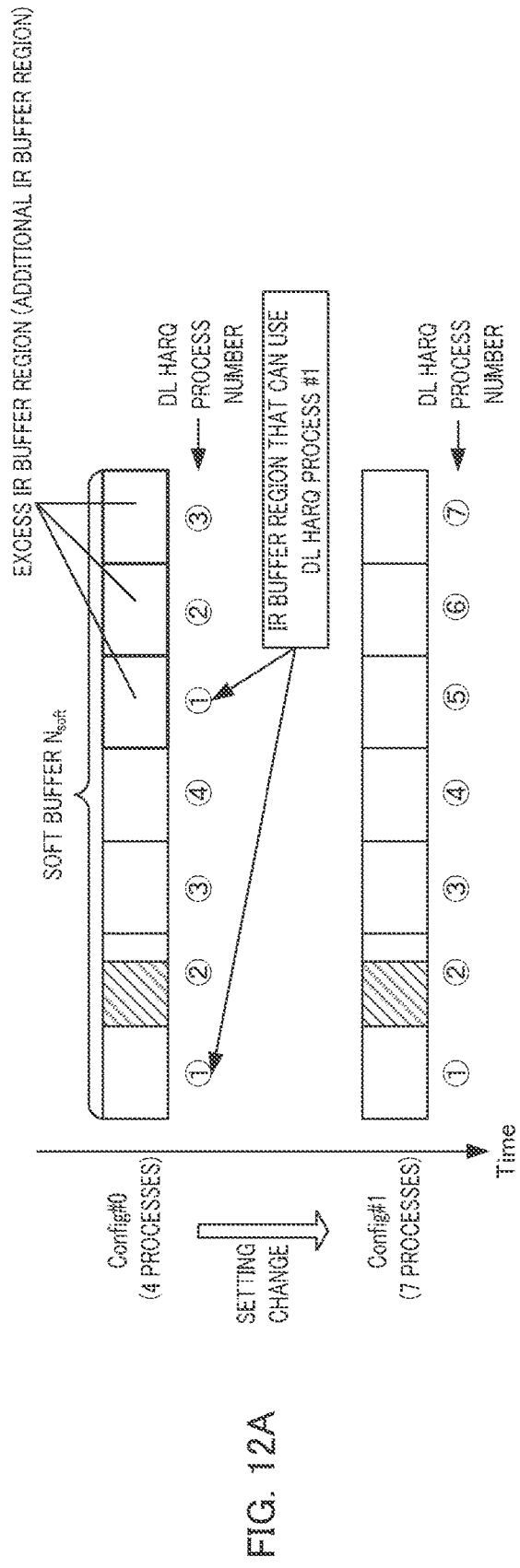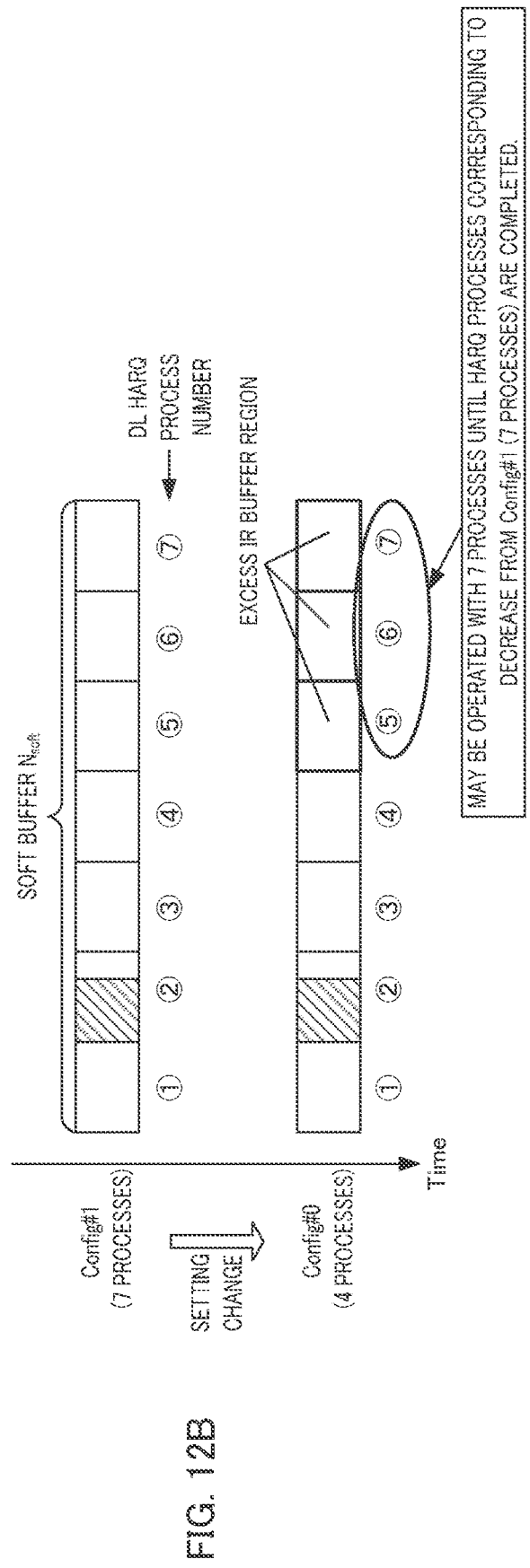

COMMUNICATION APPARATUS AND BUFFER PARTITIONING METHOD

BACKGROUND

Technical Field

The present invention relates to a terminal apparatus and a buffer dividing method.

Description of the Related Art

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (e.g., frequency bandwidth) (see, Non-Patent Literature (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established via a downlink control channel or the like.

The terminal performs "blind-determination" on each of a plurality of pieces of control information included in the received PDCCH signal (i.e., Downlink (DL) Assignment Control Information: also referred to as Downlink Control Information (DCI)). To put it more specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part indicates that the CRC operation is OK, the piece of control information is determined as being intended for the terminal.

Moreover, in 3GPP LTE, Automatic Repeat Request (ARQ) is applied to downlink data to terminals from a base station. To put it more specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. This PDCCH includes one or more L1/L2 control channels (L1/L2 CCH). Each L1/L2 CCH consists of one or more Control Channel Elements (CCE). To put it more specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits a response signal to the base station using the identified resources. However, when the L1/L2 CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. To put it more specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). To put it more specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). However, "subcarriers" in the vertical axis in FIG. 2 are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. To put it more specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communication than 3GPP LTE is in progress. 3GPP LTE-Advanced systems (may be referred to as "LTE-A system," hereinafter) follow LTE systems. 3GPP LTE-Advanced will introduce base stations and terminals capable of communicating with each other using a wideband frequency of 40 MHz or greater to realize a downlink transmission rate of up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. In the Frequency Division Duplex (FDD) system, moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced. Furthermore, "component carrier" may also be abbreviated as CC(s).

In the Time Division Duplex (TDD) system, a downlink component carrier and an uplink component carrier have the same frequency band, and downlink communication and uplink communication are realized by switching between the downlink and uplink on a time division basis. For this reason, in the case of the TDD system, the downlink component carrier can also be expressed as "downlink communication timing in a component carrier." The uplink component carrier can also be expressed as "uplink communication timing in a component carrier." The downlink component carrier and the uplink component carrier are switched based on a UL-DL configuration as shown in FIG. 3. The UL-DL configuration is indicated to a terminal by a broadcast signal called System Information Block Type 1 (SIB1) and the value thereof is the same throughout the entire system and it is assumed that the value is not frequently changed. In the UL-DL configuration shown in FIG. 3, timings are configured in subframe units (that is, 1 msec units) for downlink communication (DL) and uplink communication (UL) per frame (10 msec). The UL-DL configuration can construct a communication system capable of flexibly meeting a downlink communication throughput requirement and an uplink communication throughput requirement by changing a subframe ratio between downlink communication and uplink communication. For example, FIG. 3 illustrates UL-DL configurations (Config 0 to 6) having different subframe ratios between downlink communication and uplink communication. In addition, in FIG. 3, a downlink communication subframe is represented by "D," an uplink communication subframe is represented by "U" and a special subframe is represented by "S." Here, the special subframe is a subframe at the time of switchover from a downlink communication subframe to an uplink communication subframe. In the special subframe, downlink data communication may be performed as in the case of the downlink communication subframe. In each UL-DL configuration shown in FIG. 3, subframes (20 subframes) corresponding to 2 frames are expressed in two stages: subframes ("D" and "S" in the upper row) used for downlink communication and subframes ("U" in the lower row) used for uplink communication. Furthermore, as shown in FIG. 3, an error detection result corresponding to downlink data (ACK/NACK) is indicated in the fourth uplink communication subframe or an uplink communication subframe after the fourth subframe after the subframe to which the downlink data is assigned.

In the LTE-A system, studies are being carried out on a possibility of changing UL-DL configurations (hereinafter may be referred to as "TDD eIMTA (enhancement for DL-UL Interference Management and Traffic Adaptation)." Examples of objects of TDD eIMTA include provision of a service that meets the needs of users by a flexible change of a UL/DL ratio, a reduction of power consumption in a base station by increasing a UL ratio in a time zone with a low traffic load or the like. As a method of changing a UL-DL configuration, studies are being carried out on (1) a method by indicating an SI (System Information) signaling base, (2) a method by indicating an RRC (higher layer) signaling base and (3) a method by indicating an L1 (Physical Layer) signaling base.

Method (1) corresponds to a change of a UL-DL configuration with the lowest frequency. Method (1) is suitable for cases where an objective is to reduce power consumption in a base station by increasing a UL ratio, for example, in a time zone with a low traffic load (e.g., midnight or early morning). Method (3) corresponds to a change of a UL-DL configuration with the highest frequency. A small cell such as a pico cell has fewer terminals to be connected than a large cell such as a macro cell. In a pico cell, UL/DL traffic of the entire pico cell is determined depending on the amount of UL/DL traffic in a small number of terminals connected to the pico cell. For this reason, a violent time fluctuation in UL/DL traffic occurs in the pico cell. Therefore, method (3) is suitable for a case where a UL-DL configuration is changed in accordance with a time fluctuation in UL/DL traffic in a small cell like a pico cell. Method (2) may be positioned between method (1) and method (3) and is suitable for a case where a UL-DL configuration is changed with a medium degree of frequency.

The LTE system and LTE-A system support HARQ (Hybrid Automatic Repeat reQuest) (hereinafter, referred to as "DL HARQ") of downlink data. In DL HARQ, the LTE terminal and LTE-A terminal store an LLR (Log Likelihood Ratio) (or may also be called "soft bit") for downlink data in which an error is detected in a soft buffer. The LLR stored in the soft buffer is combined with an LLR corresponding to downlink data to be retransmitted (retransmission data). As shown in FIG. 4 and following equation 1, the soft buffer (buffer capacity: $N_{soft}$) is divided into equal portions based on the number of downlink component carriers ($K_C$) supported by a terminal, the number of multiplexed layers ($K_{MIMO}$) supported by the terminal, and the maximum number of DL HARQ processes ($M_{DL\_HARQ}$) defined in the UL-DL configuration set in the terminal, and an IR (Incremental Redundancy) buffer size ($N_{IR}$) per transport block (or TB) is calculated. The maximum number of DL HARQ processes represents the number of retransmission processes (the number of DL HARQ processes) set based on a maximum value of a retransmission interval (may also be called "RTT (Round Trip Time)") after transmission of downlink data in DL HARQ in each UL-DL configuration (Config #0 to #6) until retransmission of the downlink data (see FIG. 5).

[1]

$$N_{IR} = \left\lfloor \frac{N_{soft}}{K_C \cdot K_{MIMO} \cdot \min(M_{DL\_HARQ}, M_{limit})} \right\rfloor \quad \text{(Equation 1)}$$

As shown in FIG. 5, values of the maximum number of DL HARQ processes vary from one UL-DL configuration to another.

The terminal stores the LLR corresponding to the downlink data in which an error has been detected in an IR buffer corresponding to each DL HARQ process within a range of IR buffer size per TB calculated according to equation 1. Here, $M_{limit}$ shown in equation 1 is an allowable value of the number of DL HARQ processes that can be supported by the terminal, stored in the soft buffer and the value of $M_{limit}$ is, for example, 8. To reduce the total capacity of the soft buffer (soft buffer capacity), the IR buffer per TB cannot always store all systematic bits (LLR) per TB and all parity bits (LLR). Therefore, increasing the IR buffer size per TB as much as possible within the soft buffer capacity leads to an increase in the total amount of LLR that can be stored in the IR buffer and consequently leads to an improvement of HARQ retransmission performance.

CITATION LIST

Non-Patent Literature

NPL 1
3GPP TS 36.211 V10.1.0, "Physical Channels and Modulation (Release 10)," March 2011
NPL 2
3GPP TS 36.212 V10.1.0, "Multiplexing and channel coding (Release 10)," March 2011
NPL 3
3GPP TS 36.213 V10.1.0, "Physical layer procedures (Release 10)," March 2011
NPL4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009

BRIEF SUMMARY

Technical Problem

When different UL-DL configurations are set between terminals supporting TDD eIMTA, interference from uplink communication to downlink communication (hereinafter may be referred to as "UL-DL interference") may occur between the terminals. To avoid the occurrence of this UL-DL interference, terminals supporting TDD eIMTA may change the UL-DL configuration not for each terminal (UE specific) but for each cell (cell specific).

When the UL-DL configuration is changed for each cell, many terminals supporting TDD eIMTA are likely to change the UL-DL configuration while all DL HARQ processes have not been completed (that is, no ACK has been returned to the base station).

Furthermore, as shown in FIG. 5, the maximum number of DL HARQ processes ($M_{DL\_HARQ}$) varies among different UL-DL configurations. For this reason, when the maximum number of DL HARQ processes corresponding to any one UL-DL configuration at least before and after the change is less than 8, the IR buffer size per TB also varies before and after the change of the UL-DL configuration.

For example, as shown in FIG. 6, when Config #0 is changed to Config #1, the maximum number of DL HARQ processes is changed from 4 to 7. In this case, as shown in FIG. 6, since the number of divisions of the soft buffer also varies before and after the change of the UL-DL configuration, data reference positions in the soft buffer vary before and after the change of the UL-DL configuration. For this reason, the terminal cannot correctly read the stored data and cannot continue DL HARQ processes before and after the change of the UL-DL configuration. That is, there is concern about deterioration of HARQ retransmission performance before and after the change of the UL-DL configuration. Although the deterioration of HARQ retransmission performance is observed in aforementioned method (1) of changing the UL-DL configuration or in the case of a change of the UL-DL configuration with a low or medium frequency as shown in method (2), such deterioration of HARQ retransmission performance appears more noticeably particularly when the UL-DL configuration is changed with a high frequency as shown in method (3).

An object of the present invention is to provide a terminal apparatus and a buffer dividing method capable of reducing deterioration of HARQ retransmission performance by continuing DL HARQ processes for downlink data before and after a change of a UL-DL configuration (ratio between UL subframes and DL subframes).

Solution to Problem

A terminal apparatus according to an aspect of the present invention is a terminal apparatus capable of changing a setting of a configuration pattern of subframes forming one frame, the configuration pattern including a downlink communication subframe used for downlink communication and an uplink communication subframe used for uplink communication, the terminal apparatus including: a decoding section that stores downlink data transmitted from a base station apparatus in a buffer for retransmission and decodes the downlink data; and a transmitting section that transmits a response signal generated using an error detection result of the downlink data, in which the buffer is divided into a plurality of regions for each retransmission process based on a maximum value among numbers of retransmission processes respectively defined in a plurality of the configuration patterns capable of being set in the terminal apparatus.

A buffer dividing method according to an aspect of the present invention is a method for a terminal apparatus capable of changing a setting of a configuration pattern of subframes forming one frame, the configuration pattern including a downlink communication subframe used for downlink communication and an uplink communication subframe used for uplink communication, the buffer dividing method including: storing downlink data transmitted from a base station apparatus in a buffer for retransmission; decoding the downlink data; and transmitting a response signal generated using an error detection result of the downlink data, in which the buffer is divided into a plurality of regions for each retransmission process based on a maximum value among numbers of retransmission processes respectively defined in a plurality of the configuration patterns capable of being set in the terminal apparatus.

Advantageous Effects of Invention

According to the present invention, it is possible to reduce deterioration of HARQ retransmission performance by continuing DL HARQ processes for downlink data before and after a change of a UL-DL configuration (ratio between UL subframes and DL subframes).

BRIEF DESCRIPTION OF THE SEVERAL VIEWS OF THE DRAWINGS

FIG. 5 is a diagram illustrating a maximum number of DL HARQ processes corresponding to a UL-DL configuration;

FIGS. 12A and 12B are diagrams illustrating a method of using an excess IR buffer region according to Embodiment 2 of the present invention;

DETAILED DESCRIPTION

Figure 1:
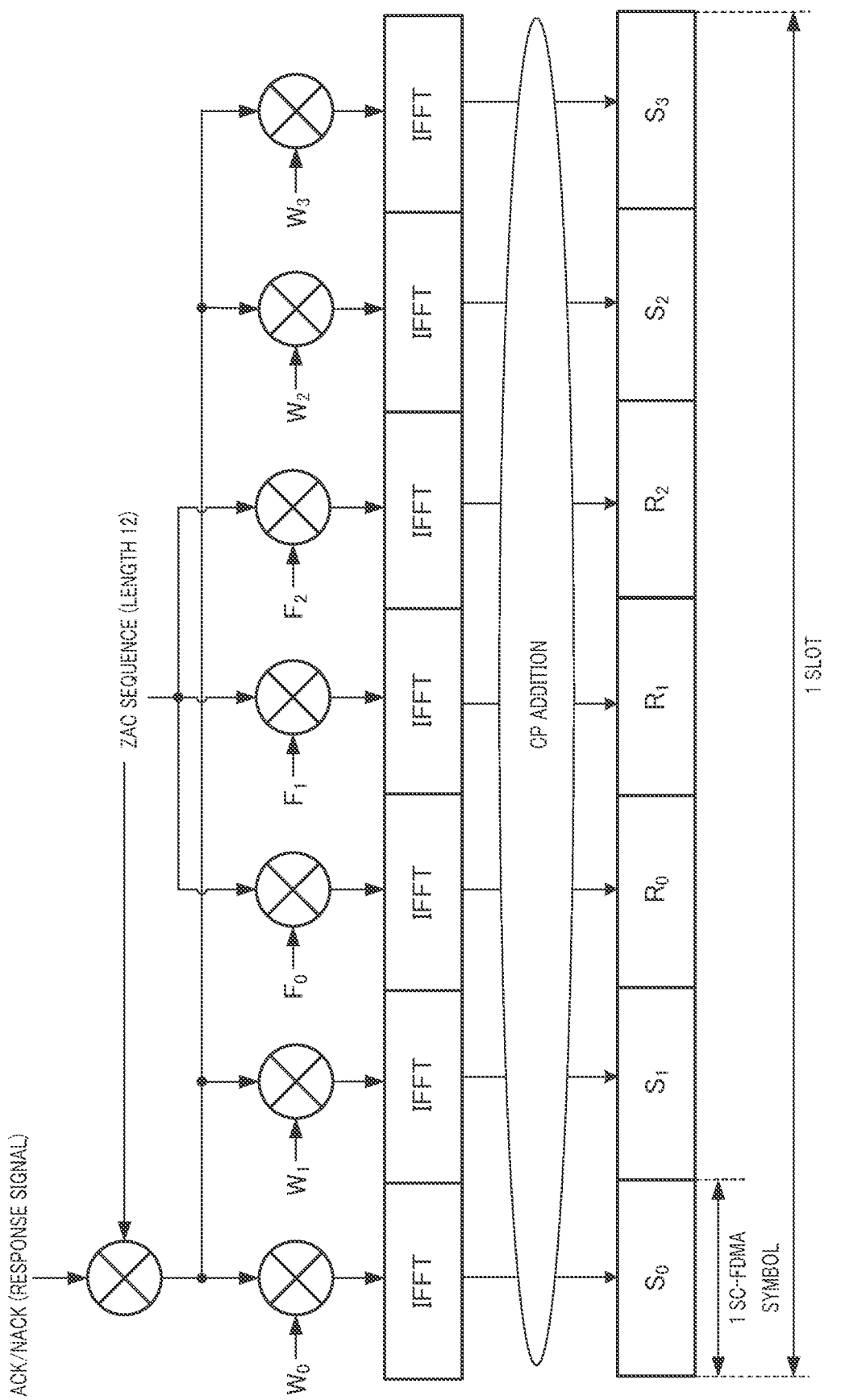
FIG. 1 is a diagram illustrating a method of spreading response signals and reference signals.
Figure 2:
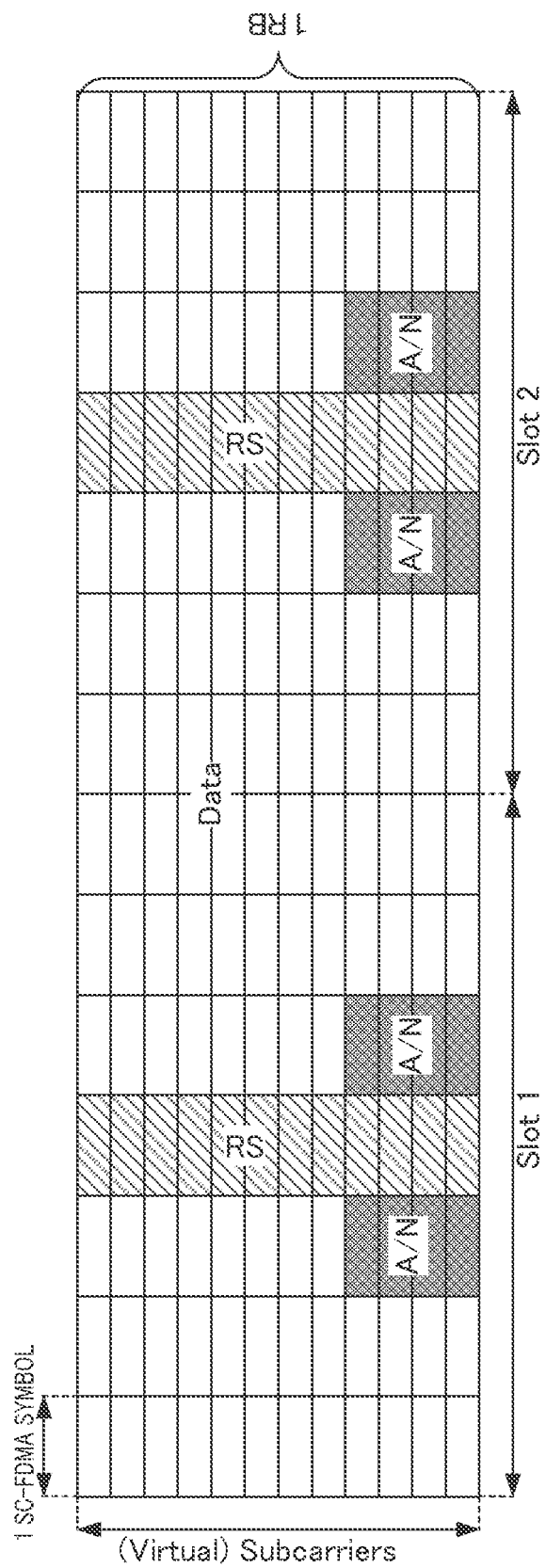
FIG. 2 is a diagram illustrating an operation related to a case where TDM is applied to response signals and uplink data on PUSCH resources.
Figure 3:
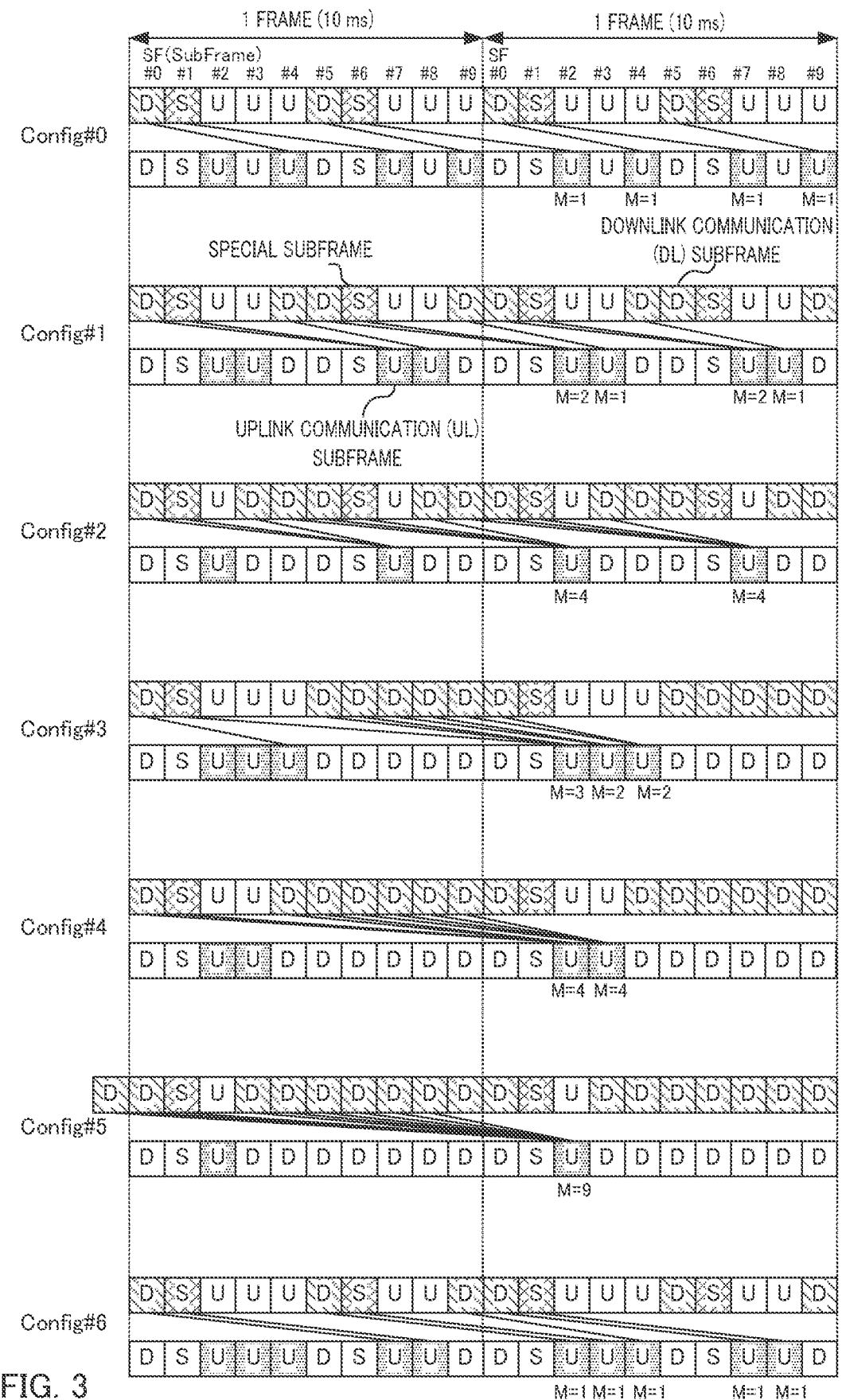
FIG. 3 is a diagram provided for describing a UL-DL configuration in TDD.
Figure 4:
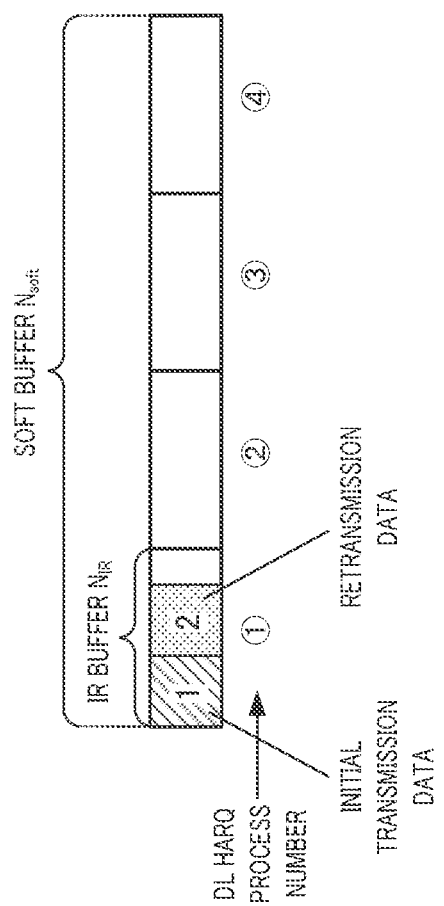
FIG. 4 is a diagram provided for describing calculation of an IR buffer size.
Figure 6:
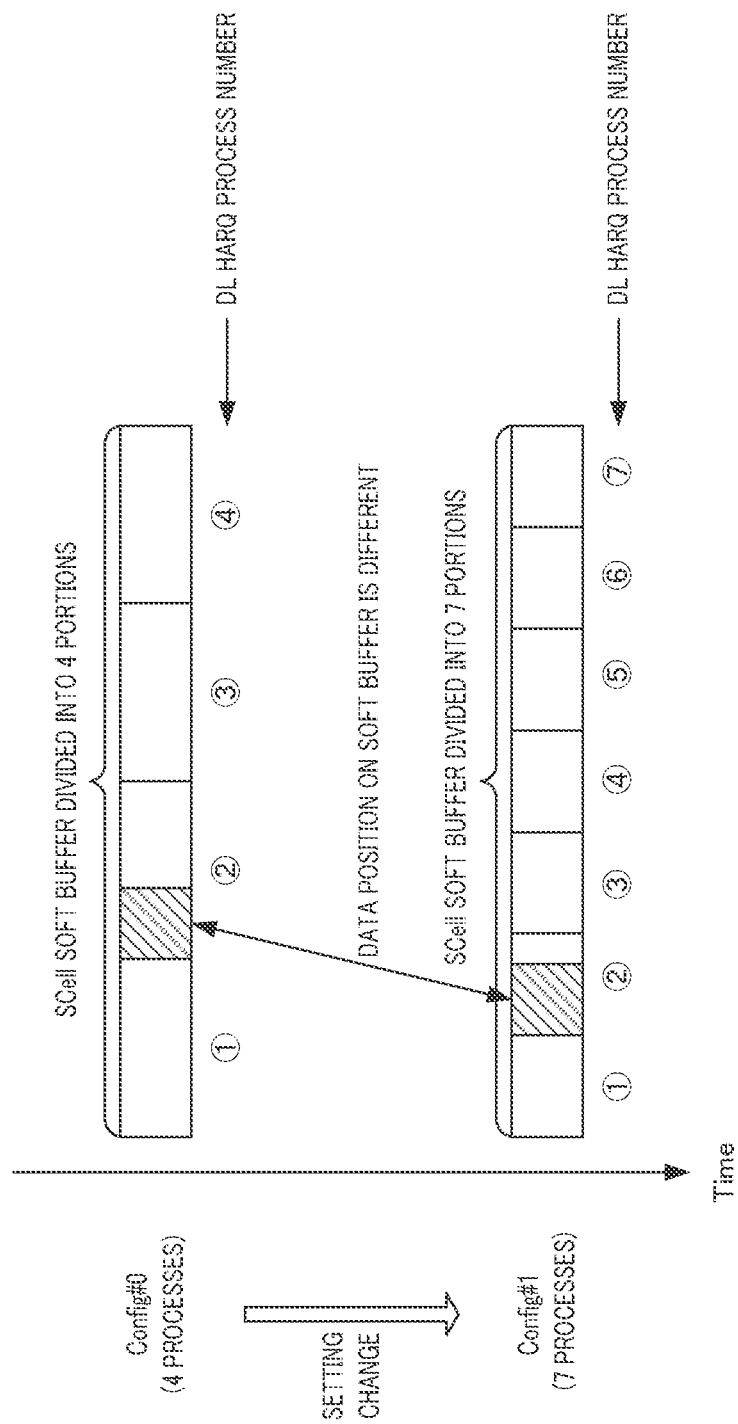
FIG. 6 is a diagram provided for describing problems involved in a change of a UL-DL configuration.

Hereinafter, embodiments of the present invention will be described in detail with reference to the accompanying drawings. Throughout the embodiments, the same elements are assigned the same reference numerals and any duplicate description of the elements is omitted.

Embodiment 1

Figure 7:
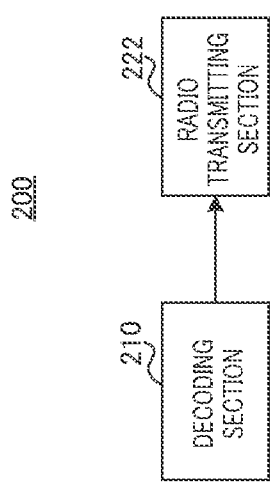
FIG. 7 is a block diagram illustrating a main configuration of a terminal according to Embodiment 1 of the present invention.

FIG. 7 is a main configuration diagram of terminal 200 according to the present embodiment. Terminal 200 can change a setting of a configuration pattern (UL-DL configuration) which is a configuration pattern of subframes forming one frame and which includes downlink communication subframes (DL subframes) used for downlink communication and uplink communication subframes (UL subframe) used for uplink communication. In terminal 200, decoding section 210 stores downlink data transmitted from a base station in a retransmission buffer (soft buffer), decodes the downlink data and radio transmitting section 222 transmits response signals generated using error detection results of the downlink data. Here, the above soft buffer is divided into a plurality of regions (IR buffers) for each retransmission process based on a maximum value among a number of retransmission processes (maximum number of DL HARQ processes) defined for each of a plurality of configuration patterns that can be set in terminal 200.

Hereinafter, a case will be described where one downlink component carrier is set in terminal 200 for simplicity of description. A case will be described where no MIMO (Multiple Input Multiple Output) is set in terminal 200 (non-MIMO). That is, in equation 1, suppose $K_C=1$ (one downlink component carrier is used) and $K_{MIMO}=1$ (non-MIMO, the number of multiplexed layers: 1). That is, the following description will focus on the maximum number of DL HARQ processes ($M_{DL\_HARQ}$) shown in equation 1.

(Configuration of Base Station)

Figure 8:
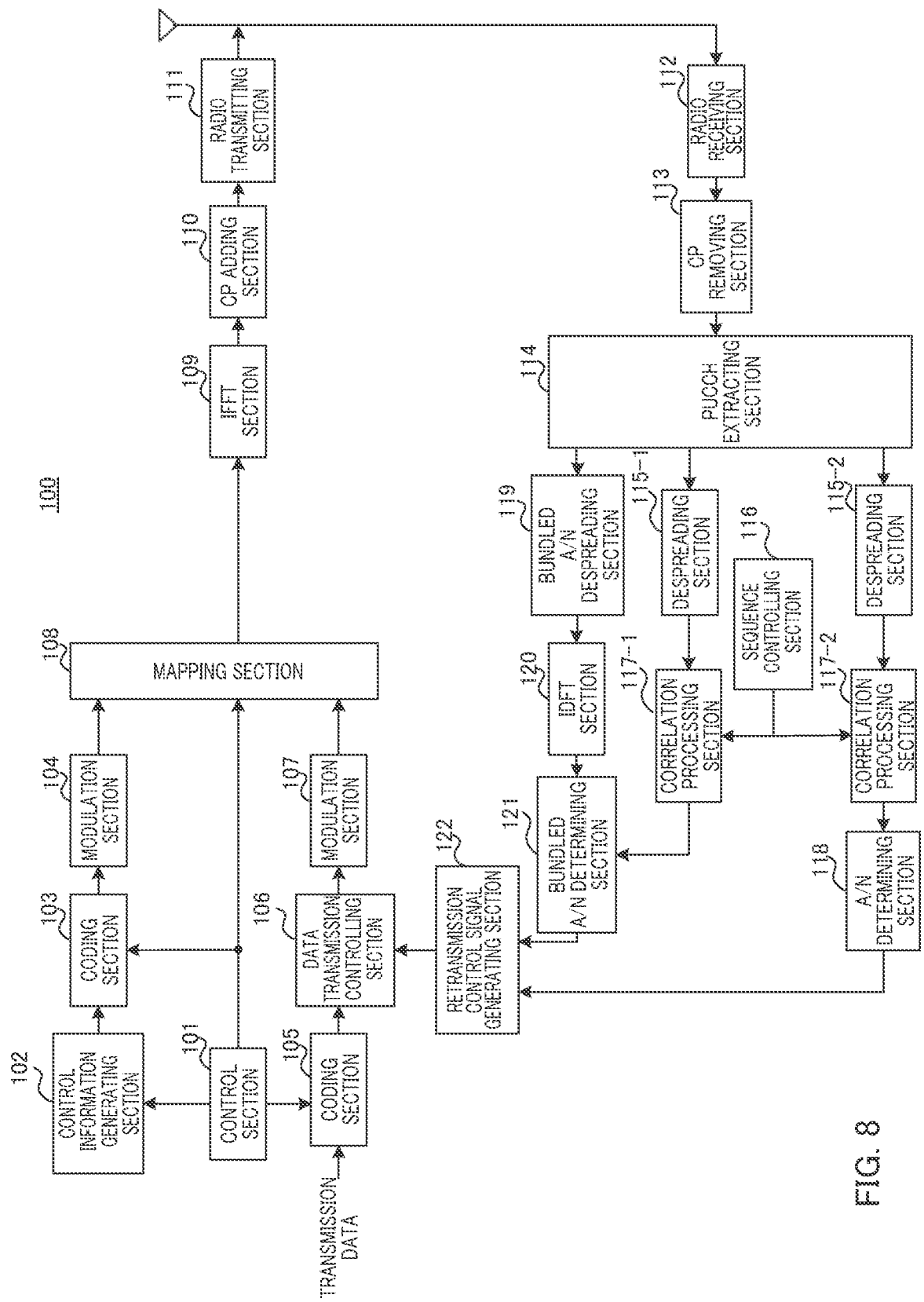
FIG. 8 is a block diagram illustrating a configuration of a base station according to Embodiment 1 of the present invention.

FIG. 8 is a configuration diagram of base station 100 according to Embodiment 1 of the present invention. In FIG. 8, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. To put it more specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)." Control information generating section 102 references, for example, the retransmission control signal (not shown) generated by retransmission control signal generating section 122 and includes, in the control information, retransmission information indicating whether transmission of downlink data whose transmission is controlled by data transmission controlling section 106 is initial transmission or retransmission.

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106.

Data transmission controlling section 106 outputs the coded transmission data to modulation section 107 and also keeps the coded transmission data at the initial transmission. The coded transmission data is kept for each destination terminal 200.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals.

The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously indicated to terminal 200. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously indicated to terminal 200.

Sequence controlling section 116 generates a base sequence that may be used for spreading each of the A/N indicated from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence controlling section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

To put it more specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information inputted from bundled A/N determining section 121 and the information inputted from A/N determining section 118 and generates retransmission control signals based on the result of determination. To put it more specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 9:
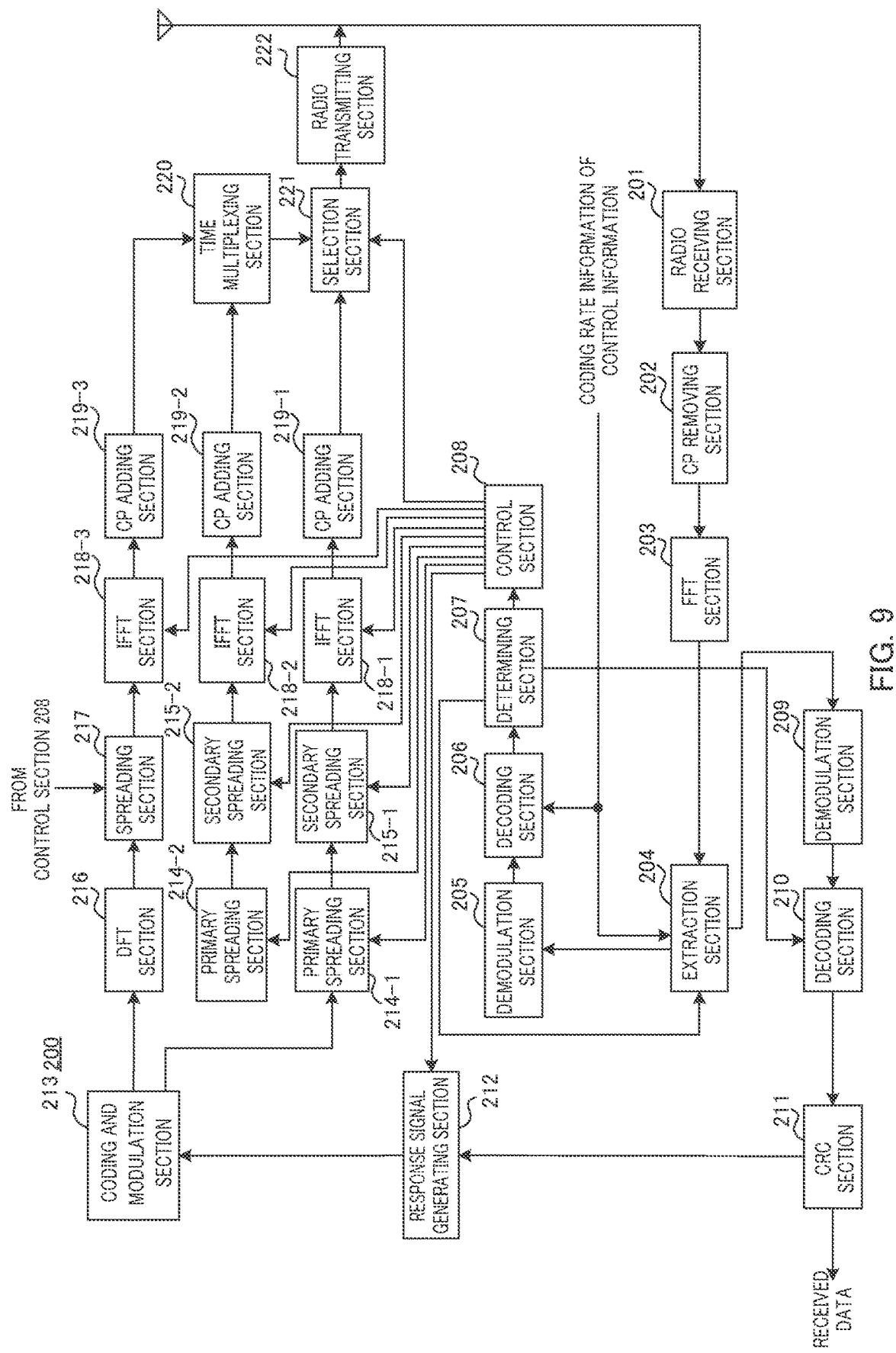
FIG. 9 is a block diagram illustrating a configuration of the terminal according to Embodiment 1 of the present invention.

FIG. 9 is a block diagram illustrating a configuration of terminal 200 according to Embodiment 1. In FIG. 9, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. To put it more specifically, the number of CCEs forming a downlink control information assignment resource varies depending on the coding rate.

Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

Furthermore, determination section 207 outputs retransmission information included in the control information intended for terminal 200 indicating whether transmission of downlink data to terminal 200 is initial transmission or retransmission to decoding section 210.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource.

Demodulation section 209 demodulates the downlink data received from extraction section 204 and outputs the demodulated downlink data (LLR) to decoding section 210.

When the retransmission information received from determination section 207 indicates initial transmission, decoding section 210 stores the downlink data (LLR) received from demodulation section 209 in the retransmission buffer (soft buffer). Decoding section 210 further decodes the downlink data received from demodulation section 209 and outputs the decoded downlink data to CRC section 211. On the other hand, when the retransmission information received from determination section 207 indicates retransmission, decoding section 210 combines the downlink data received from demodulation section 209 and the downlink data read from the retransmission buffer and stores the combined downlink data in the retransmission buffer again. Moreover, decoding section 210 decodes the combined downlink data and outputs the decoded downlink data to CRC section 211. Details of the method of calculating a retransmission buffer size (dividing method) and the method of storing downlink data in the retransmission buffer will be described later.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier inputted from CRC section 211 and information indicating a predetermined group number. To put it more specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

Primary-spreading sections 214-1 and 214-2 corresponding to the A/N resources and reference signal resources of the bundled ACK/NACK resources spread the ACK/NACK signals or reference signals using the base sequence corresponding to the resources in accordance with the instruction from control section 208 and output the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

[Operations of Base Station 100 and Terminal 200]

Operations of base station 100 and terminal 200 having the above-described configurations will be described.

Base station 100 indicates to terminal 200 beforehand a set of UL-DL configurations that can be set. This set of UL-DL configurations that can be set is information indicating UL-DL configurations changeable through TDD eIMTA.

Terminal 200 divides a soft buffer into equal portions: a plurality of IR buffers based on the maximum number of DL HARQ processes which is largest among a maximum number of DL HARQ processes defined in each UL-DL configuration of the set of UL-DL configurations that can be set. The IR buffer size is determined in this manner.

The method of calculating the IR buffer size ($N_{IR}$) in terminal 200 will be described using FIG. 10 and FIG. 11, and equation 2. In the following description, it is assumed in equation 2 that $K_C=1$ (one downlink component carrier is used) and $K_{MIMO}=1$ (non-MIMO).

[2]

$$N_{IR} = \left\lfloor \frac{N_{soft}}{K_C \cdot K_{MIMO} \cdot \min(\max(M_{DL\_HARQ,eIMTA\_Config}), M_{limit})} \right\rfloor \quad \text{(Equation 2)}$$

Figure 10:
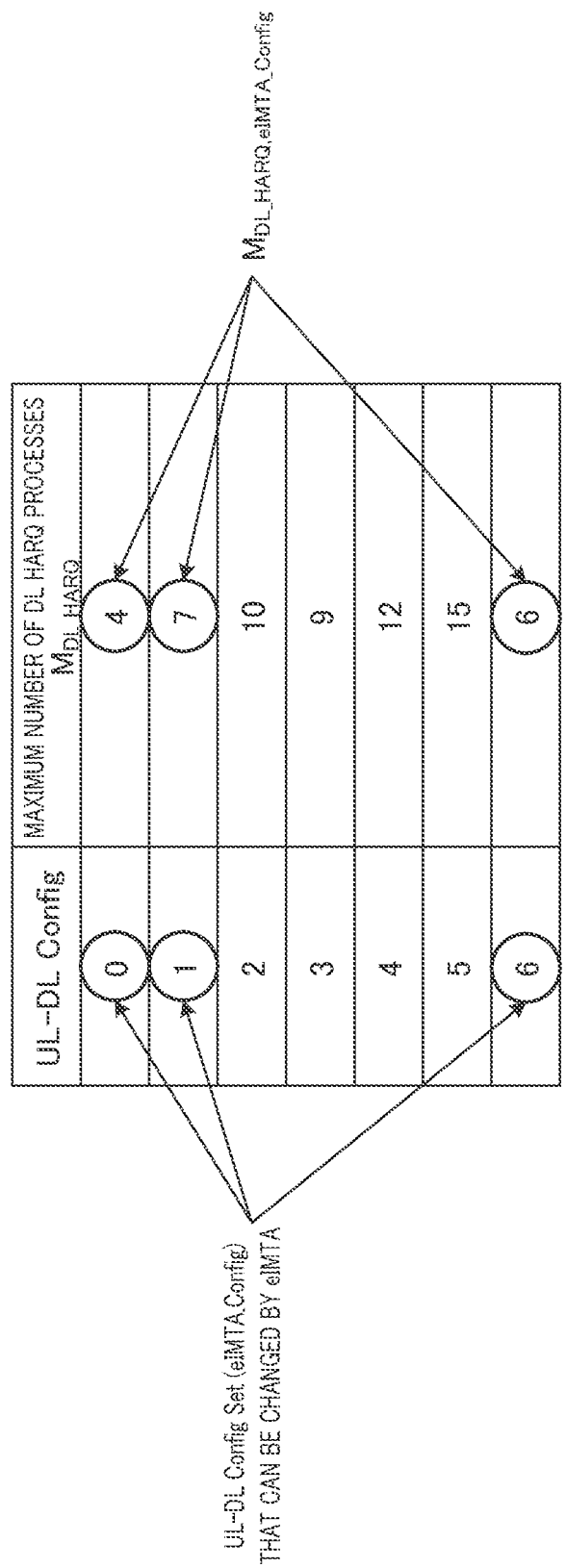
FIG. 10 is a diagram illustrating a method of dividing a soft buffer according to Embodiment 1 of the present invention.
Figure 11:
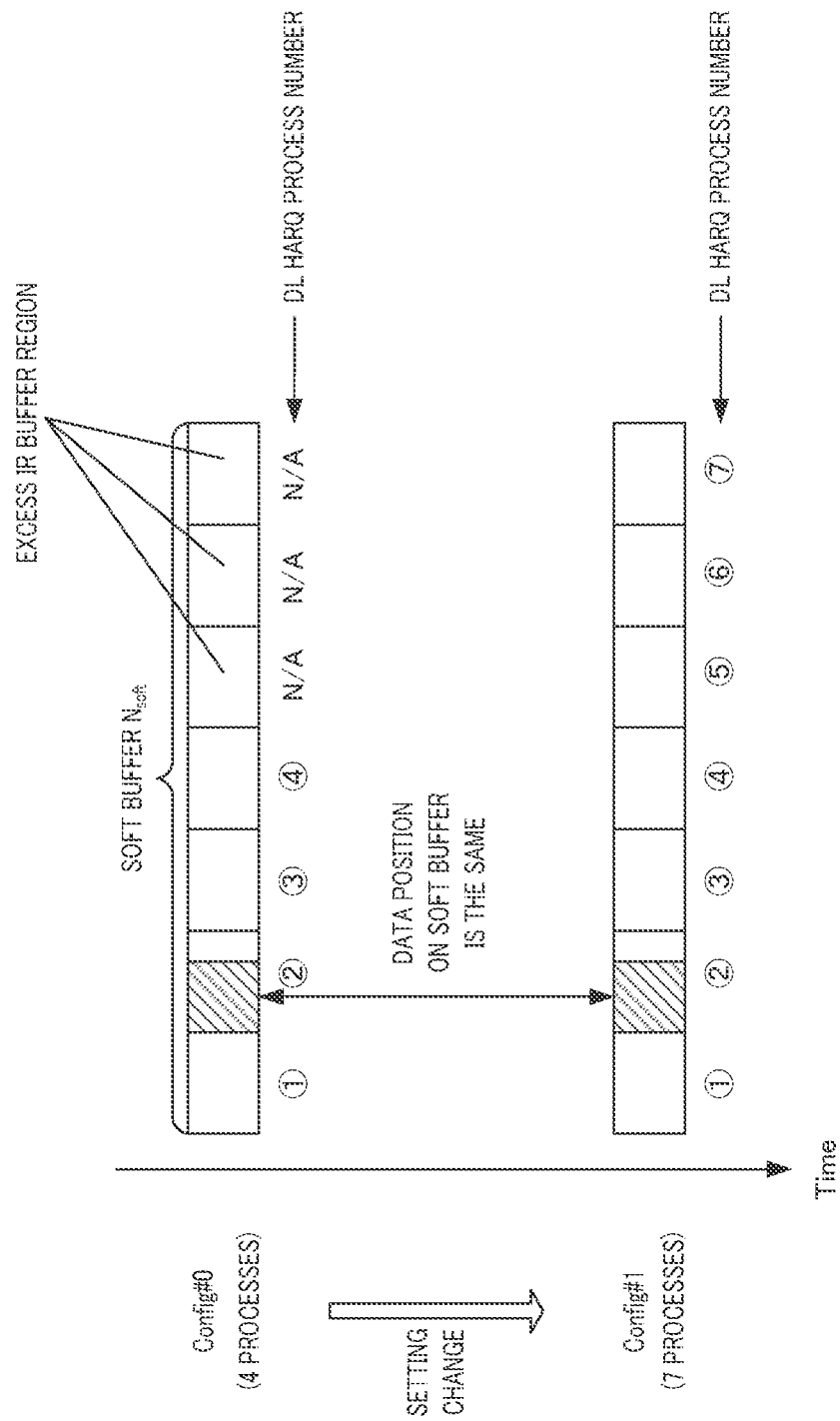
FIG. 11 is a diagram illustrating a method of dividing a soft buffer according to Embodiment 1 of the present invention.

In FIG. 10 and FIG. 11, a set of UL-DL configurations changeable through TDD eIMTA (eIMTA_Config) in terminal 200 may be expressed as UL-DL configuration #0 (hereinafter, may also be expressed as "Config #0," the same applies to other UL-DL configurations) Config #1, and Config #6 (that is, eIMTA_Config={#0, #1, #6}).

FIG. 10 illustrates a maximum number of DL HARQ processes ($M_{DL\_HARQ}$) defined in each UL-DL configuration. As shown in FIG. 10, the maximum numbers of DL HARQ processes defined in Config #0, Config #1 and Config #6 which are eIMTA_Configs of terminal 200 are 4, 7 and 6 respectively. That is, $M_{DL\_HARQ,eIMTA\_Config}$ shown in equation 2={4, 6, 7}.

Therefore, the maximum number of DL HARQ processes (maximum value) which is largest among the maximum numbers of DL HARQ processes defined in each UL-DL configuration of the set of UL-DL configurations changeable is 7. That is, $\max(M_{DL\_HARQ,eIMTA\_Config})$ shown in equation 2=7.

The soft buffer (buffer capacity: $N_{soft}$) is divided into equal portions: a number of IR buffers (here, divided into 7 portions) corresponding to a maximum value (max ($M_{DL\_HARQ,eIMTA\_Config}$)=7) of the maximum number of DL HARQ processes or a maximum allowable value ($M_{limit}$=8) of the number of DL HARQ processes that can be supported by terminal 200, whichever is the smaller (min(max ($M_{DL\_HARQ,eIMTA\_Config}$),$M_{limit}$)=7).

FIG. 11 illustrates an example of the soft buffer dividing method in the case where the UL-DL configuration in terminal 200 in which eIMTA_Config={#0, #1, #6} is set is changed from Config #0 to Config #1.

The maximum number of DL HARQ processes differs between the different UL-DL configurations before and after the change. However, as described above, the soft buffer possessed by terminal 200 is divided into seven equal portions ($N_{IR}=N_{soft}/7$) regardless of the UL-DL configurations before and after the change.

The respective DL HARQ processes in the UL-DL configuration are assigned to IR buffers (IR buffer group) corresponding to the maximum number of DL HARQ processes defined in the UL-DL configuration set in terminal 200 at a present point in time among the seven IR buffers. To put it more specifically, as shown in FIG. 11, DL HARQ processes of DL HARQ process numbers 1 to 4 are respectively assigned to the first to fourth IR buffers (corresponding to the maximum number of DL HARQ processes defined in Config #0) from the left among the seven IR buffers obtained by dividing the soft buffer into seven portions before the change (Config #0). Similarly, DL HARQ processes of DL HARQ process numbers 1 to 7 are assigned to the seven IR buffers (corresponding to the maximum number of DL HARQ processes defined in Config #1) after the change (Config #1).

That is, as shown in FIG. 11, before the change (Config #0), terminal 200 executes DL HARQ using four IR buffers corresponding to the maximum number of DL HARQ processes defined in Config #0 among the seven IR buffers. On the other hand, as shown in FIG. 11, after the change (Config #1), terminal 200 executes DL HARQ using all of the seven IR buffers (corresponding to the maximum number of DL HARQ processes defined in Config #1).

Thus, although the maximum number of DL HARQ processes differs before the change (Config #0) and after the change (Config #1), the positions in the IR buffer (positions in which downlink data is arranged) relating to the DL HARQ processes of DL HARQ process numbers 1 to 4 are the same. Therefore, terminal 200 can correctly read downlink data (LLR) of the same DL HARQ process (DL HARQ process number 2 in FIG. 11) stored in the IR buffer at the same position on the soft buffer before and after the change of the UL-DL configuration. That is, terminal 200 can continue the DL HARQ processes even before and after the change of the UL-DL configuration.

Note that as shown in FIG. 11, of the maximum number of DL HARQ processes defined in each UL-DL configuration of the set of UL-DL configurations that can be set in terminal 200, when the maximum number of DL HARQ processes (e.g., 4 in Config #0) defined in the UL-DL configuration being used by terminal 200 is smaller than the maximum number of DL HARQ processes (e.g., 7 in FIG. 10 and FIG. 11) which is largest, IR buffers corresponding to the numbers of DL HARQ processes corresponding to the difference thereof (IR buffer regions indicated by N/A (Not Available) shown in FIG. 11) are not used. That is, of the plurality of IR buffers obtained by dividing the soft buffer, remaining IR buffers other than the IR buffers assigned to the respective DL HARQ processes of the UL-DL configuration set in terminal 200 at a current point in time are not used. Hereinafter, the above-described IR buffer regions not used may be called "excess IR buffer regions."

As described above, in the present embodiment, terminal 200 divides the soft buffer into a plurality of IR buffers for each DL HARQ process based on a maximum value in the maximum number of DL HARQ processes defined in the UL-DL configurations that can be set in terminal 200. By so doing, terminal 200 can correctly read data stored in the IR buffers corresponding to the same DL HARQ process before and after the change of the UL-DL configuration when at least one UL-DL configuration is less than 8 ($M_{limit}$) (in FIG. 10, when it is changeable to one of the UL-DL configurations of Config #0, Config #1 and Config #6) of the maximum number of DL HARQ processes defined in the respective UL-DL configurations that can be set in terminal 200. That is, terminal 200 can continue DL HARQ before and after the change of the UL-DL configuration. Thus, according to the present embodiment, it is possible to reduce deterioration of the HARQ retransmission performance by continuing DL HARQ processes on downlink data before and after the change of the UL-DL configuration.

Embodiment 2

A case has been described in Embodiment 1 where no excess IR buffer region is used. In contrast, a method of effectively using excess IR buffer regions will be described in Embodiment 2.

Hereinafter, method 1 (FIG. 12A) and method 2 (FIG. 12B) for using excess IR buffer regions will be described.

In the following description, as with Embodiment 1, a set of UL-DL configurations changeable by TDD eIMTA for terminal 200 is assumed to be Config #0, Config #1 and Config #6 (that is, eIMTA_Config={#0, #1, #6}). That is, as shown in FIG. 12A and FIG. 12B, a soft buffer in terminal 200 is divided into seven portions.

That is, in use method 1 (FIG. 12A), excess IR buffer regions (three IR buffers) are generated before the change of the UL-DL configuration (Config #0: maximum number of DL HARQ processes: 4). On the other hand, in use method 2 (FIG. 12B), excess IR buffer regions (three IR buffers) are generated after the change of the UL-DL configuration (Config #0).

<Use Method 1>

In FIG. 12A, terminal 200 uses the excess IR buffer regions as additional IR buffer regions for DL HARQ processes existing in a UL-DL configuration in use. To put it more specifically, in FIG. 12A, terminal 200 uses three excess IR buffer regions as additional IR buffer regions for three DL HARQ processes (DL HARQ process numbers 1 to 3) of the four DL HARQ processes (DL HARQ process numbers 1 to 4) existing in Config #0 being used by terminal 200.

That is, a number of DL HARQ processes (3 processes in FIG. 12A) corresponding to the difference between the total number of IR buffers (7 in FIG. 12A) obtained by dividing the soft buffer and a maximum number of DL HARQ processes (4 in FIG. 12A) defined in the UL-DL configuration in use are assigned to the excess IR buffer regions.

This allows terminal 200 to use two IR buffers for DL HARQ processes of DL HARQ process numbers 1 to 3.

When instructed from base station 100 to change the UL-DL configuration, terminal 200 resets downlink data stored in the excess IR buffer regions (additional IR buffer regions).

As described above, when the maximum number of DL HARQ processes defined in the UL-DL configuration set in terminal 200 at a current point in time is smaller than the number of IR buffers (the number of divisions of the soft buffer), one of DL HARQ processes in the UL-DL configuration is assigned to remaining IR buffers (corresponding to a second region group, that is, excess IR buffer regions) other than IR buffers (corresponding to a first region group) to which DL HARQ processes in the UL-DL configuration have been assigned among a plurality of IR buffers.

In this way, terminal 200 uses the excess IR buffer regions as additional IR buffer regions for DL HARQ processes existing in the UL-DL configuration in use, and can thereby increase the IR buffer size per DL HARQ process. It is thereby possible to improve the error correction performance and improve the HARQ retransmission performance compared to the case where no excess IR buffer region is used (e.g., see FIG. 11).

As in the case of Embodiment 1, terminal 200 can correctly read data stored in IR buffers corresponding to the same DL HARQ processes (DL HARQ process numbers 1 to 4 in FIG. 12A) (IR buffers other than excess IR buffer regions) before and after the change of the UL-DL configuration. For this reason, terminal 200 can continue DL HARQ processes even if downlink data stored in the excess IR buffer regions (additional IR buffer regions) is reset due to the change of the UL-DL configuration.

A case has been described in FIG. 12A where a plurality of DL HARQ processes existing in the UL-DL configuration in use are assigned to a plurality of additional IR buffer regions. However, only a single DL HARQ process existing in the UL-DL configuration in use may be assigned to the plurality of additional IR buffer regions.

A case has been described in FIG. 12A where the whole additional IR buffer region has been divided into three equal portions (the same size as the IR buffer size) to be assigned to three DL HARQ processes respectively, but the present invention is not limited to this. For example, the whole additional IR buffer region may be evenly re-divided by the maximum number of DL HARQ processes defined in the UL-DL configuration in use (divided into four equal portions in Config #0 shown in FIG. 12A) and all DL HARQ processes in the UL-DL configuration may be assigned to the respective re-divided regions respectively.

As described above, the excess IR buffer regions may possibly be reset due to an increase in the number of DL HARQ processes caused by the change of the UL-DL configuration. Thus, when the excess IR buffer regions are used as additional IR buffer regions, terminal 200 may store parity bits in the additional IR buffer regions preferentially. It is thereby possible to prevent systematic bits of a high degree of importance from being reset.

<Use Method 2>

In FIG. 12B, terminal 200 uses excess IR buffer regions as IR buffer regions for DL HARQ processes which are nonexistent in the UL-DL configuration in use. To put it more specifically, in FIG. 12B, terminal 200 uses three excess IR buffer regions as IR buffer regions corresponding to DL HARQ processes (DL HARQ process numbers 5 to 7) which are nonexistent in DL HARQ processes (DL HARQ process numbers 1 to 4) of Config #0 being used by terminal 200 but existing in Config #1 used by terminal 200 immediately before the change.

That is, when the maximum number of DL HARQ processes defined in the UL-DL configuration set in terminal 200 at a current point in time is smaller than the number of IR buffers (the number of divisions of the soft buffer), DL HARQ processes assigned to within a region corresponding to the excess IR buffer regions among DL HARQ processes in the UL-DL configuration set last in terminal 200 are continuously assigned to remaining IR buffers (corresponding to a second region group, that is, excess IR buffer regions) other than IR buffers (corresponding to a first region group) to which the DL HARQ processes in the UL-DL configuration are assigned among the plurality of IR buffers.

In this way, even when instructed from base station 100 to change the UL-DL configuration from Config #1 to Config #0, terminal 200 continues DL HARQ processes on excess IR buffer regions without resetting downlink data stored in the IR buffer regions (DL HARQ process numbers 5 to 7) which become the excess IR buffer regions.

As described above, terminal 200 uses the excess IR buffer regions as IR buffer regions for DL HARQ processes which are nonexistent in the UL-DL configuration in use. Even when the number of DL HARQ processes decreases due to the change of the UL-DL configuration in particular, it is thereby possible to continue DL HARQ in DL HARQ processes corresponding to the decrease. That is, terminal 200 can continue DL HARQ even when the DL HARQ processes corresponding to the above-described decrease have not completed at the time of the change of the UL-DL configuration. Thus, compared to a case where no excess IR buffer region is used (e.g., see FIG. 11), it is possible to improve the HARQ retransmission performance.

A case has been described in FIG. 12B where a plurality of DL HARQ processes existing in the last set UL-DL configuration are assigned to a plurality of excess IR buffer regions. However, only a single DL HARQ process existing in the last set UL-DL configuration may be assigned to the plurality of excess IR buffer regions.

Use method 1 and use method 2 of excess IR buffer regions have been described so far.

By this means, in the present embodiment, even when the maximum number of DL HARQ processes defined in the UL-DL configuration being used by terminal 200 is smaller than the number of the plurality of IR buffers (the number of divisions of the soft buffer) obtained by dividing the soft buffer, it is possible to effectively use IR buffers (excess IR buffer regions) corresponding to the number of DL HARQ processes corresponding to the difference thereof. Compared to Embodiment 1, the present embodiment can thereby further improve the HARQ retransmission performance.

Regarding whether to use excess IR buffer regions as additional IR buffer regions for DL HARQ processes existing in the UL-DL configuration in use (use method 1: FIG. 12A) or use excess IR buffer regions as IR buffer regions for DL HARQ processes which are nonexistent in the UL-DL configuration in use (use method 2: FIG. 12B), one of the two may be defined beforehand or switching between the two may be performed by a setting. For example, terminal 200 may set use method 2 (FIG. 12B) if DL HARQ processes before the change of the UL-DL configuration need to be continued even after the change and set use method 1 (FIG. 12A) if DL HARQ processes before the change of the UL-DL configuration need not be continued after the change.

Embodiment 3

A case will be described in the present embodiment where when excess IR buffer regions are used as in the case of Embodiment 2, DL HARQ processes to which excess IR buffer regions are assigned are further defined.

Embodiment 2 (FIG. 12A and FIG. 12B) does not define what size of an excess IR buffer region is assigned to which DL HARQ process. For this reason, while resetting or continuation of DL HARQ processes (which may simply be called "HARQ continuation") is repeated for each IR buffer due to a change of the UL-DL configuration, even if the UL-DL configuration is changed to the same UL-DL configuration again, the order of DL HARQ process numbers assigned to excess IR buffer regions may be different from the initially assigned order of DL HARQ process numbers.

Figure 13:
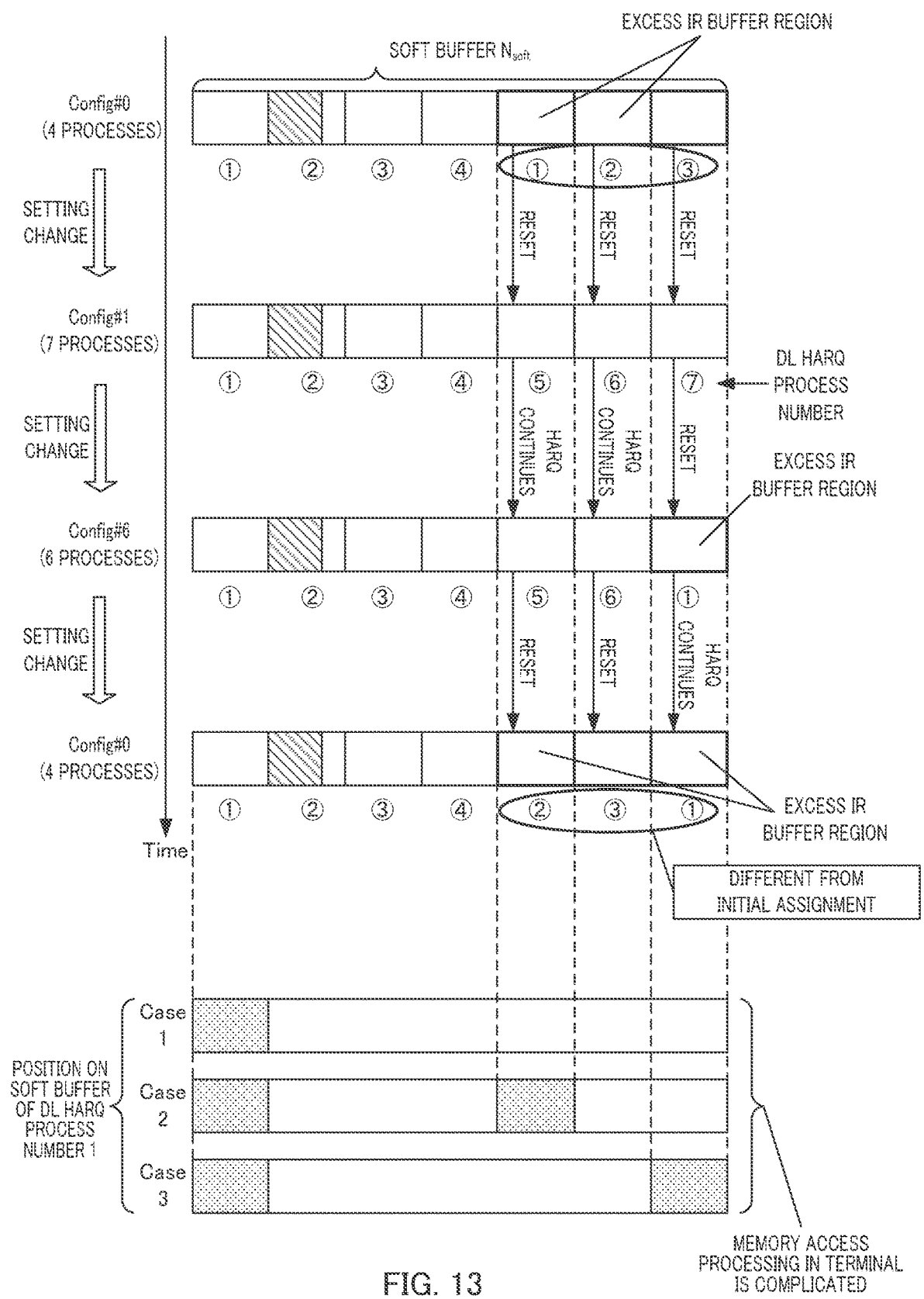
FIG. 13 is a diagram provided for describing problems involved in memory access according to Embodiment 3 of the present invention.

For example, FIG. 13 illustrates assignment of DL HARQ processes in excess IR buffer regions when the UL-DL configuration is changed in order of Config #0, Config #1, Config #6, Config #0.

As shown in FIG. 13, at a point in time at which Config #0 is set first, DL HARQ processes are assigned to three excess IR buffer regions in order of DL HARQ process numbers 1, 2, 3. Next, when the setting is changed to Config #1, all the excess IR buffer regions are reset and the setting is changed to Config #6, a DL HARQ process of DL HARQ process number 1 is assigned to one excess IR buffer region. When the setting is changed to Config #1 again, the DL HARQ process of DL HARQ process number 1 is continued in the excess IR buffer region which already existed before the setting change and DL HARQ processes are assigned to two newly generated excess IR buffer regions in order of DL HARQ process numbers 2 and 3 respectively.

That is, in FIG. 13, the order of DL HARQ processes assigned to excess IR buffer regions (order of DL HARQ process numbers 2, 3, 1) when reset to Config #0 becomes different from the order of DL HARQ processes assigned to excess IR buffer regions (order of DL HARQ process numbers 1, 2, 3) when Config #0 is initially set. Thus, the order of DL HARQ processes stored in excess IR buffer regions differs depending on the change of the UL-DL configuration.

As a result, the example of FIG. 13 shows three cases of IR buffers corresponding to DL HARQ process number 1 (including excess IR buffer regions): when only the first from the left is the IR buffer (Case 1: when Config #1 is set), when the first and fifth from the left are the IR buffers (Case 2: when first Config #0 is set) and when the first and seventh from the left are the IR buffers (Case 3: when Config #6 is set and when Config #0 is reset). This means that processing of access to the soft buffer in the terminal has been complicated.

Thus, the present embodiment will describe a method of simplifying the processing of access to the soft buffer in terminal 200.

Figure 14:
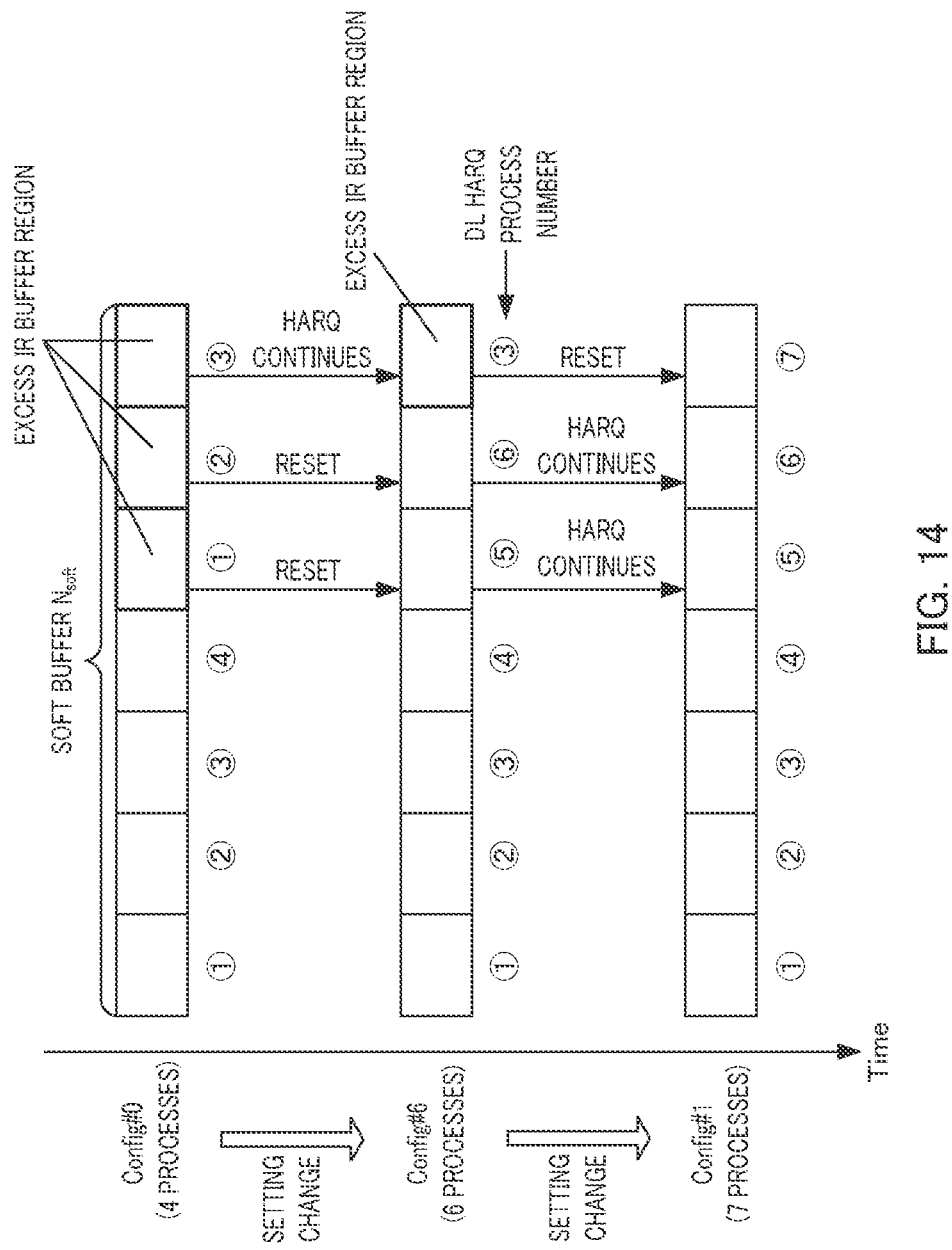
FIG. 14 is a diagram illustrating an example of a method of using an excess IR buffer region according to Embodiment 3 of the present invention.
Figure 15:
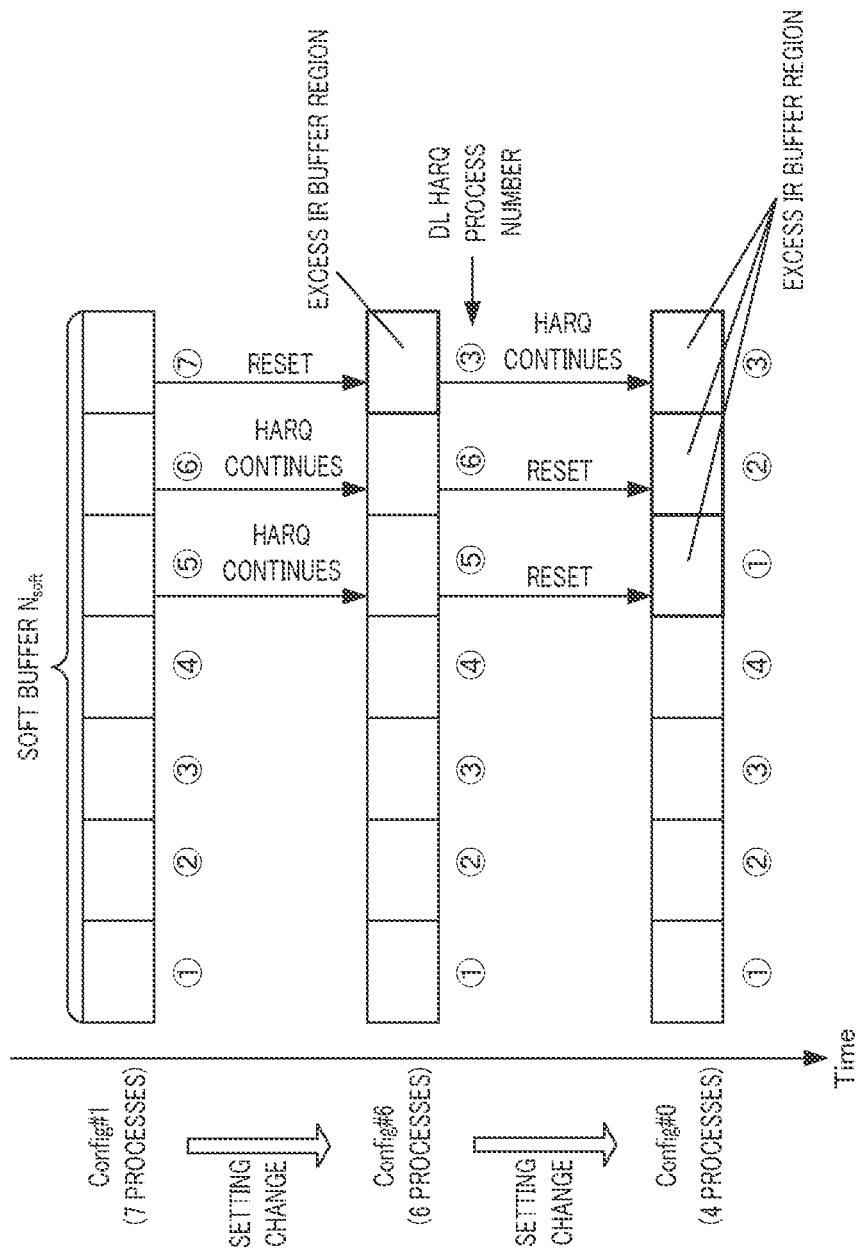
FIG. 15 is a diagram illustrating an example of a method of using an excess IR buffer region according to Embodiment 3 of the present invention.

FIGS. 14 and 15 illustrate a soft buffer configuration according to the present embodiment.

In the following description, as in the case of Embodiment 2, a set of UL-DL configurations changeable by TDD eIMTA on terminal 200 is assumed to be Config #0, Config #1, Config #6 (that is, eIMTA_Config={#0, #1, #6}). That is, the soft buffer is divided into seven portions in terminal 200.

FIG. 14 illustrates a case where the UL-DL configuration is changed in order of Config #0, Config #6, Config #1 and FIG. 15 illustrates a case where the UL-DL configuration is changed in order of Config #1, Config #6, Config #0. In FIGS. 14 and 15, a maximum of three excess IR buffer regions (fifth to seventh IR buffers from left) are generated when Config #0 is set and one excess IR buffer region (seventh IR buffer from left) is generated when Config #6 is set.

In the present embodiment, a plurality of IR buffers obtained by dividing the soft buffer are associated with DL HARQ processes in the respective UL-DL configurations beforehand.

To put it more specifically, in FIGS. 14 and 15, DL HARQ processes of DL HARQ process numbers 1 to 4 are associated with the first to fourth IR buffers from the left of the seven IR buffers respectively.

In FIGS. 14 and 15, the DL HARQ process of DL HARQ process number 1 and the DL HARQ process of DL HARQ process number 1 are associated with the fifth IR buffer from the left of the seven IR buffers. Likewise, the DL HARQ process of DL HARQ process number 6 and the DL HARQ process of DL HARQ process number 2 are associated with the sixth IR buffer from the left. The DL HARQ process of DL HARQ process number 7 and the DL HARQ process of DL HARQ process number 3 are associated with the seventh IR buffer from the left.

That is, the IR buffer region associated with DL HARQ process number 5 and the excess IR buffer region associated with DL HARQ process number 1 become common IR buffers. Similarly, the IR buffer region associated with DL HARQ process number 6 and the excess IR buffer region associated with DL HARQ process #2 become common IR buffers. The IR buffer region associated with DL HARQ process number 7 and the excess IR buffer region associated with DL HARQ process #3 become common IR buffers. That is, in FIGS. 14 and 15, common IR buffer regions are assigned to DL HARQ process number n (where, n=1, 2, 3) and DL HARQ process number n+4. In other words, DL HARQ process numbers are fixedly associated with each excess IR buffer region regardless of the change of the UL-DL configuration.

Figure 16:
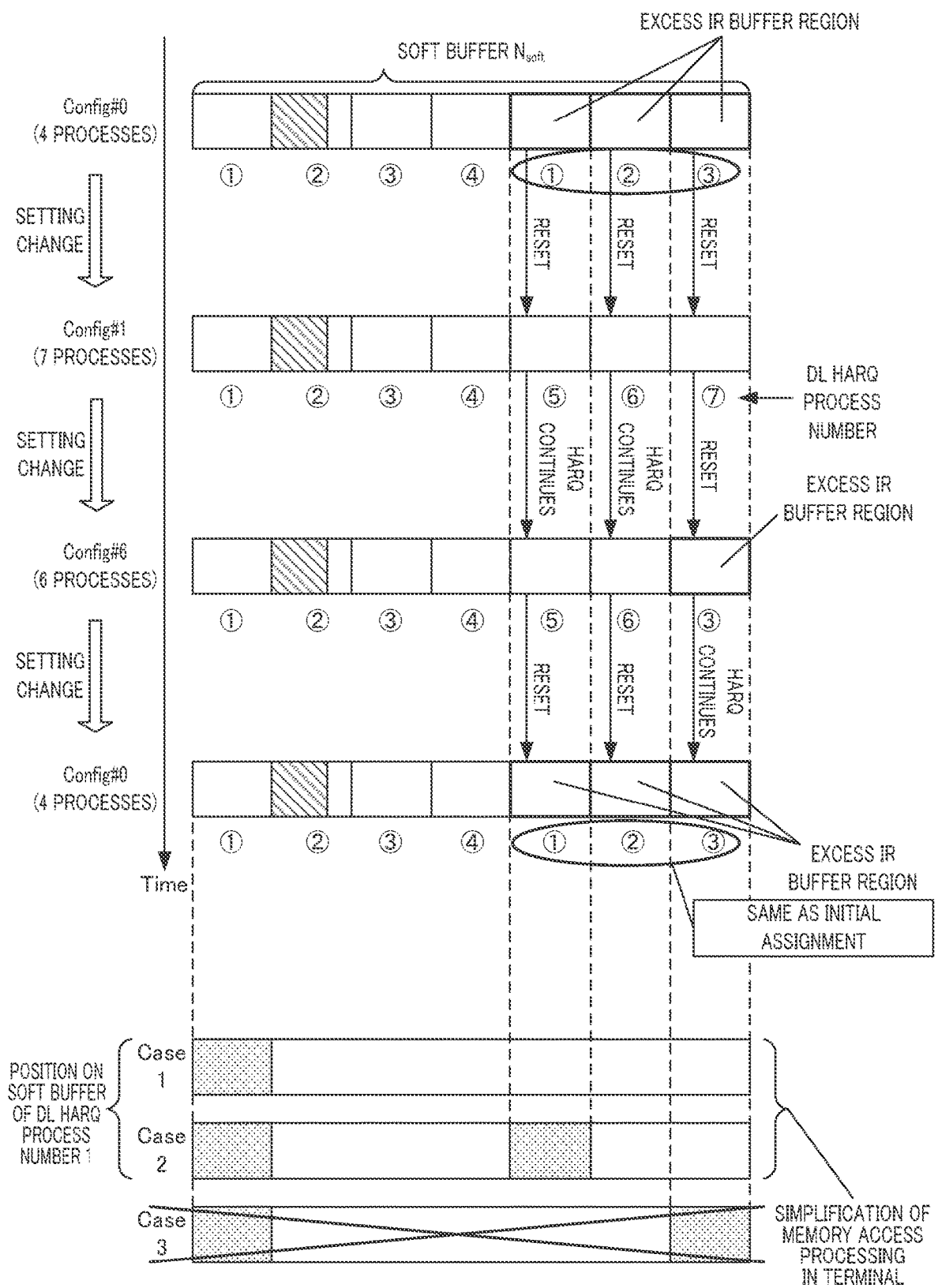
FIG. 16 is a diagram provided for describing an effect of memory access according to Embodiment 3 of the present invention.

FIG. 16 illustrates assignment of DL HARQ processes in excess IR buffer regions when the same change of the UL-DL configuration as in FIG. 13 takes place to illustrate the effect of simplification of a memory configuration in the present embodiment.

In FIG. 16, DL HARQ processes are always assigned to three excess IR buffer regions in order of DL HARQ process numbers 1, 2, 3 respectively regardless of the UL-DL configuration. Thus, the example of FIG. 16 shows two cases of the IR buffer corresponding to DL HARQ process number 1 (including the excess IR buffer region): when only the first from the left is the IR buffer (Case 1: when Config #1 is set) and when the first and fifth from the left are the IR buffers (Case 2: when Config #0 is set). That is, while the number of positions that can be taken by the IR buffer corresponding to DL HARQ process number 1 is 3 in FIG. 13, the number of positions can be reduced to 2 in the present embodiment. That is, in FIG. 16, it is possible to simplify processing of access to the soft buffer in terminal 200 compared to FIG. 13.

Figure 17:
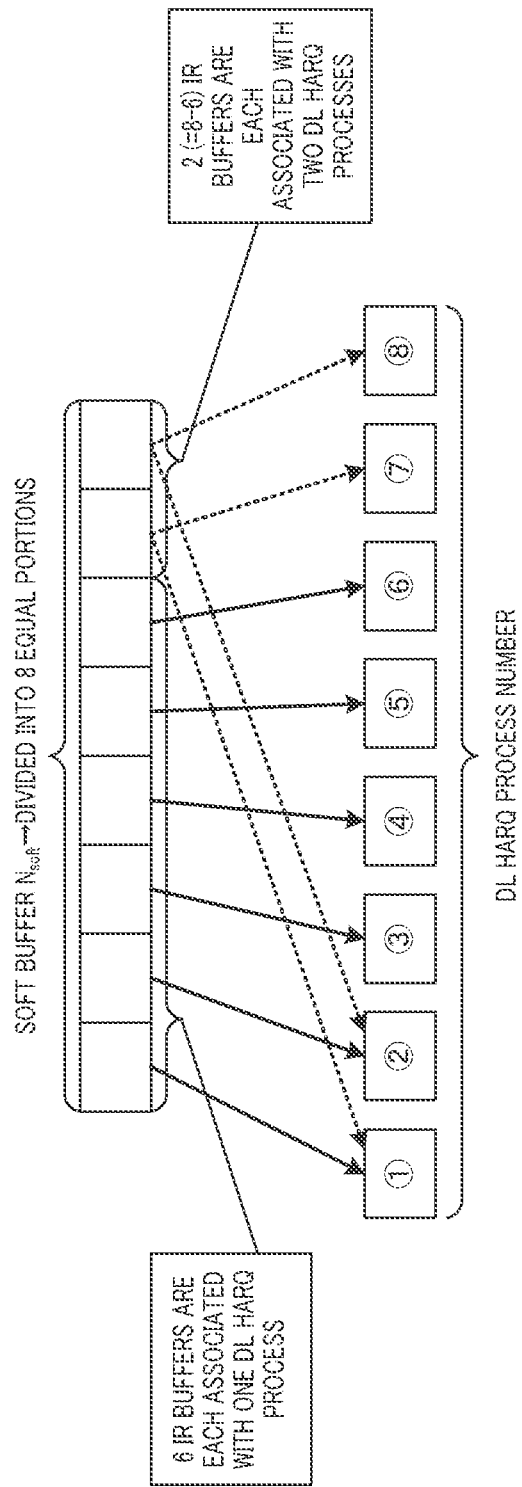
FIG. 17 is a diagram provided for describing a concept of a simple memory access method according to Embodiment 3 of the present invention.

FIG. 17 illustrates a conceptual diagram of correspondence between IR buffers and DL HARQ process numbers.

In FIG. 17, an IR buffer obtained by dividing the soft buffer (buffer capacity $N_{soft}$) into 8 ($=\min(\max(M_{DL\_HARQ,eIMTA\_Config}), M_{limit})$) equal portions is assumed to be one unit (therefore, $\min(\max(M_{DL\_HARQ,eIMTA\_Config}), M_{limit})$=8 units in total). DL HARQ process numbers are respectively assigned to DL HARQ processes corresponding to a maximum number of DL HARQ processes defined in each UL-DL configuration in each of a plurality of UL-DL configurations that can be set in terminal 200 in ascending order from the same number (here '1'). In FIG. 17, a minimum value ($\min(M_{DL\_HARQ,eIMTA\_Config})$) in a maximum number of DL HARQ processes defined in a plurality of UL-DL configurations that can be set in terminal 200 is assumed to be 6 processes. That is, the difference between the number of IR buffers obtained by dividing the soft buffer and the above-described minimum value ($=\min(\max(M_{DL\_HARQ,eIMTA\_Config}), M_{limit})-\min(\min(M_{DL\_HARQ,eIMTA\_Config}), M_{limit})$) is 2.

In FIG. 17, of 8 IR buffer units, 6 ($=\min(\min(M_{DL\_HARQ,eIMTA\_Config}), M_{limit})$) units are assigned to 6 ($=\min(\min(M_{DL\_HARQ,eIMTA\_Config}), M_{limit})$) DL HARQ processes (DL HARQ process numbers 1 to 6), one unit for each DL HARQ process (correspondence indicated by a solid line arrow). That is, a number of DL HARQ processes corresponding to the above-described minimum value are respectively fixedly associated with a number of IR buffers (corresponding to the third region group) corresponding to a minimum value (6 processes) of the above-described maximum number of DL HARQ processes among a plurality of IR buffers in ascending order from DL HARQ process number 1 to DL HARQ process number 6.

On the other hand, of the 8 IR buffer units, the remaining 2 ($=\min(\max(M_{DL\_HARQ,eIMTA\_Config}), M_{limit})-\min(\min(M_{DL\_HARQ,eIMTA\_Config}), M_{limit})$) units are assigned to the remaining 2 ($=\min(\max(M_{DL\_HARQ,eIMTA\_Config}), M_{limit})-\min(\min(M_{DL\_HARQ,eIMTA\_Config}), M_{limit})$) DL HARQ processes (DL HARQ process numbers 7 and 8), and at the same time, are also assigned to 2 ($=\min(\max(M_{DL\_HARQ,eIMTA\_Config}), M_{limit})-\min(\min(M_{DL\_HARQ,eIMTA\_Config}), M_{limit})$) DL HARQ processes of the 6 ($=\min(\min(M_{DL\_HARQ,eIMTA\_Config}), M_{limit})$) DL HARQ processes which have already been assigned, one unit for each DL HARQ process (correspondence indicated by a dotted line arrow). That is, a number of DL HARQ processes corresponding to the above-described difference (2 processes) in ascending order from DL HARQ process number 7 next to DL HARQ process number 6, and a number of DL HARQ processes corresponding to the above-described difference (2 processes) of the DL HARQ processes of DL HARQ process numbers 1 to 6 (here, DL HARQ process numbers 1 and 2) are respectively fixedly associated with the remaining IR buffers (corresponding to the fourth region group) other than the IR buffer (corresponding to the third region group) to which a number of DL HARQ processes corresponding to the above-described minimum value (6 processes) among the plurality of IR buffers.

As described above, according to the present embodiment, access positions (buffer addresses) of the soft buffer corresponding to DL HARQ process numbers are fixed regardless of the change of the UL-DL configuration. This makes it possible to simplify processing of access to the soft buffer in terminal 200.

A case has been described in FIGS. 14 and 15 where DL HARQ process number n (where, n=1, 2, 3) and DL HARQ process number n+4 are assigned to a common IR buffer region. However, the combination of DL HARQ process numbers assigned to the common IR buffer region is not limited to this.

In FIG. 16, although the first IR buffer from the left and the fifth IR buffer are located as positions dispersed from each other on the soft buffer, this is an example of logical arrangement (logical addresses) of the IR buffers and physical arrangement (physical addresses) of these IR buffers may be arranged at neighboring positions on the soft buffer.

Parity bits may be preferentially stored in one IR buffer (that is, excess IR buffer region) unit common to one of DL HARQ processes #5 to #7 of the IR buffers corresponding to DL HARQ processes #1 to #4 shown in FIGS. 14 and 15. In this way, it is possible to prevent systematic bits of a high degree of importance from being reset due to a change of the UL-DL configuration.

The embodiments of the present invention have been described so far.

In the above embodiment, instead of indicating to terminal 200 a set of UL-DL configurations changeable in terminal 200, base station 100 may calculate $\min(\max(M_{DL\_HARQ,eIMTA\_Config}, M_{limit}))$ shown in equation 2 and indicate the calculation result to terminal 200. In this case, since the calculation result of $\min(\max(M_{DL\_HARQ,eIMTA\_Config}, M_{limit}))$ can take only 4, 6, 7 or 8, base station 100 may indicate 2-bit information to terminal 200. Thus, it is possible to reduce the number of bits to be indicated to terminal 200 more than the number of bits ($3n$ ($n \geq 2$) bits) required to indicate the set of UL-DL configurations changeable.

In the above embodiment, considering that $M_{limit}=8$, that the maximum number of DL HARQ processes ($M_{HARQ}$) defined in the four UL-DL configurations (Config #2 to #5) of the seven UL-DL configurations are greater than 8 (=$M_{limit}$) as shown in FIG. 5, and that the number of UL-DL configurations changeable by eIMTA is plural, the calculation result of $\min(\max(M_{DL\_HARQ,eIMTA\_Config}, M_{limit}))$ shown in equation 2 is likely to be 8 in many cases. Thus, base station 100 may not indicate the set of UL-DL configurations changeable or the calculation result of $\min(\max(M_{DL\_HARQ,eIMTA\_Config}, M_{limit}))$ to terminal 200 in which TDD eIMTA is set, and terminal 200 may calculate the IR buffer size ($N_{IR}$) always assuming that $\min(\max(M_{DL\_HARQ,eIMTA\_Config}, M_{limit}))=8$. That is, when TDD eIMTA is not set, terminal 200 may calculate the IR buffer size according to equation 1, and when TDD eIMTA is set, terminal 200 may calculate the IR buffer size according to following equation 3. In this case, terminal 200 can continue DL HARQ processes before and after the change of the UL-DL configuration without signaling to terminal 200 of the set of UL-DL configurations changeable or the calculation result of $\min(\max(M_{DL\_HARQ,eIMTA\_Config}, M_{limit}))$ or the like.

[3]

$$N_{IR} = \left\lfloor \frac{N_{soft}}{K_C \cdot K_{MIMO} \cdot M_{limit}} \right\rfloor \quad \text{(Equation 3)}$$

A case has been described in the above embodiment where the soft buffer is divided by $M_{DL\_HARQ,eIMTA\_Config}$ or $M_{limit}$, whichever is the smaller value according to equations 1 to 3. However, terminal 200 is not limited to this, but the soft buffer may be divided, for example, by max ($M_{DL\_HARQ,eIMTA\_Config}$) without using $M_{limit}$ which is a threshold.

A case has been described in the above embodiment where $M_{limit}=8$ as shown in equations 1 to 3. This is a value corresponding to the maximum number of DL HARQ processes that can be handled by the base station (eNB), for example, in an FDD system. However, the value of $M_{limit}$ is not limited to 8. In a TDD system in particular, the maximum number of DL HARQ processes that can be handled by base station 100 is greater than the maximum number of DL HARQ processes (8) that can be handled by the base station in the FDD system. For example, in UL-DL Config #5, the maximum number of DL HARQ processes that can be handled by base station 100 is 15. Thus, the value of $M_{limit}$ may be any value not exceeding the number of DL HARQ processes that can be handled by base station 100.

In the above embodiment, when DL HARQ processes are not continued, this case has been expressed as an IR buffer being "reset." However, the IR buffer need not actually be reset (flashed), and it is only necessary to prevent downlink data stored in the IR buffer from being read to be used for decoding. Therefore, it is only necessary to indicate whether transmission is initial transmission or not in the DL HARQ process corresponding to the IR buffer. A signal indicating whether transmission is initial transmission or retransmission is indicated by an NDI (New Data Indicator) in downlink data assignment information (that is, DL assignment). When the NDI has a value inverted from a value at the time of the previous reception in DL assignment indicating downlink data in the DL HARQ process corresponding to the IR buffer, this indicates initial transmission, and when the NDI is not any inverted value, this indicates retransmission.

Although an antenna has been described in the aforementioned embodiments, the present invention may be similarly applied to an antenna port.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, how many physical antennas are included in the antenna port is not defined in LTE, but the antenna port is defined as the minimum unit allowing the base station to transmit different reference signals in LTE.

In addition, an antenna port may be specified as a minimum unit to be multiplied by a precoding vector weighting.

In the foregoing embodiments, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal apparatus according to the embodiments described above is a terminal apparatus capable of changing a setting of a configuration pattern of subframes forming one frame, the configuration pattern including a downlink communication subframe used for downlink communication and an uplink communication subframe used for uplink communication, the terminal apparatus including: a decoding section that stores downlink data transmitted from a base station apparatus in a buffer for retransmission and decodes the downlink data; and a transmitting section that transmits a response signal generated using an error detection result of the downlink data, in which the buffer is divided into a plurality of regions for each retransmission process based on a maximum value among numbers of retransmission processes respectively defined in a plurality of the configuration patterns capable of being set in the terminal apparatus.

In the terminal apparatus according to the embodiments, each retransmission process in a first configuration pattern is assigned to each region of a first region group corresponding to a number of first retransmission processes defined in the first configuration pattern set in the terminal apparatus at a current point in time among the plurality of regions.

In the terminal apparatus according to the embodiments, when the number of the first retransmission processes is smaller than the number of the plurality of regions, one of retransmission processes in the first configuration pattern is assigned to a remaining second region group other than the first region group among the plurality of regions.

In the terminal apparatus according to the embodiments, a number of retransmission processes corresponding to a difference between the number of the plurality of regions and the number of the first retransmission processes are assigned to each region of the second region group.

In the terminal apparatus according to the embodiments, the entire second region group is re-divided into a number of regions corresponding to the number of first retransmission processes and all retransmission processes in the first configuration pattern are assigned to the respective re-divided regions.

In the terminal apparatus according to the embodiments, only one retransmission process in the first configuration pattern is assigned to the second region group.

In the terminal apparatus according to the embodiments, when the number of the first retransmission processes is smaller than the number of the plurality of regions, retransmission processes assigned to a region in the second region group among retransmission processes in a second configuration pattern set last in the terminal apparatus are continuously assigned to a remaining second region group other than the first region group among the plurality of regions.

In the terminal apparatus according to the embodiments, only one retransmission process in the second configuration pattern is assigned to the second region group.

In the terminal apparatus according to the embodiments: retransmission processes corresponding to the number of retransmission processes defined in each configuration pattern are respectively assigned numbers in ascending order from an identical first number in each of the plurality of configuration patterns; a number of retransmission processes corresponding to a minimum value up to a second number in ascending order from the first number are fixedly associated with each region of a third region group corresponding to the minimum value among a number of retransmission processes respectively defined in the plurality of configuration patterns among the plurality of regions; and a number of retransmission processes corresponding to a difference between the number of the plurality of regions and the minimum value, and a number of retransmission processes corresponding to the difference in retransmission processes from the first number to the second number are respectively fixedly associated with each region of a remaining fourth region group other than the third region group among the plurality of regions in ascending order from a third number next to the second number.

In the terminal apparatus according to the embodiments, the number of the plurality of regions is a smaller one of the maximum value and a predetermined threshold.

A buffer dividing method according to the embodiments is a method for a terminal apparatus capable of changing a setting of a configuration pattern of subframes forming one frame, the configuration pattern including a downlink communication subframe used for downlink communication and an uplink communication subframe used for uplink communication, the buffer dividing method including: storing downlink data transmitted from a base station apparatus in a buffer for retransmission; decoding the downlink data; and transmitting a response signal generated using an error detection result of the downlink data, in which the buffer is divided into a plurality of regions for each retransmission process based on a maximum value among numbers of retransmission processes respectively defined in a plurality of the configuration patterns capable of being set in the terminal apparatus.

The disclosure of the specification, drawings and abstract in Japanese Patent Application No. 2012-159759 filed on Jul. 18, 2012 is incorporated herein by reference in its entirety.

INDUSTRIAL APPLICABILITY

The present invention is suitable for use in mobile communication systems, for example.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time multiplexing section
221 Selection section

The invention claimed is:

1. A terminal apparatus comprising:
a receiver, which, in operation, receives, from a higher layer, information indicating an UL/DL configuration, which is usable for downlink HARQ and variable pursuant to enhancement for UL-DL Interference Management and Traffic Adaptation (eIMTA), out of a plurality of UL/DL configurations that respectively define composition of uplink subframes and downlink subframes in a frame; and
circuitry, which is coupled to the receiver and which, in operation, stores a received data in a soft buffer having a soft buffer size for a transport block, wherein the soft buffer size is calculated based on a fixed value regardless of variation of the usable UL/DL configuration.

2. The terminal apparatus according to claim 1, wherein the receiver, in operation, receives the information transmitted according to Radio Resource Control (RRC).

3. The terminal apparatus according to claim 1, wherein the soft buffer size is calculated based on the fixed value regardless of a maximum number of downlink HARQ processes allowed for the usable UL/DL configuration.

4. The terminal apparatus according to claim 3, wherein the maximum number of downlink HARQ processes allowed for the usable UL/DL configuration is a greatest number among multiple maximum numbers of downlink HARQ processes respectively allowed for multiple usable UL/DL configurations.

5. The terminal apparatus according to claim 1, wherein the receiver, in operation, receives the information that indicates one of multiple UL/DL configurations usable for downlink HARQ.

6. The terminal apparatus according to claim 1, wherein the soft buffer size for the transport block is calculated to be the same regardless of variation of the usable UL/DL configuration.

7. The terminal apparatus according to claim 1, wherein the usable UL/DL configuration is the same within a cell.

8. The terminal apparatus according to claim 1, wherein the fixed value is 8.

9. The terminal apparatus according to claim 1, wherein the plurality of UL/DL configurations consist of 7 UL/DL configurations, of which 3 UL/DL configurations are usable for downlink HARQ.

10. The terminal apparatus according to claim 1, wherein the terminal apparatus's total soft buffer capacity is divided into multiple portions each having the soft buffer size for the transport block.

11. The terminal apparatus according to claim 1, wherein the circuitry, in operation, decodes the received data by combining the received data stored in the soft buffer with a received data that is retransmitted.

12. The terminal apparatus according to claim 1, wherein the soft buffer size for the transport block is calculated by:

obtaining a product of a number of component carriers supported by the terminal apparatus, a number of layers supported by the terminal apparatus, and the fixed value;

obtaining a ratio between a total size of the soft buffer and the product; and if the ratio is not an integer, rounding the ratio down to a previous integer.

13. A communication method comprising:

receiving, from a higher layer, information indicating an UL/DL configuration, which is usable for downlink HARQ and variable pursuant to enhancement for UL-DL Interference Management and Traffic Adaptation (eIMTA), out of a plurality of UL/DL configurations that respectively define composition of uplink subframes and downlink subframes in a frame; and storing a received data in a soft buffer having a soft buffer size for a transport block, wherein the soft buffer size is calculated based on a fixed value regardless of variation of the usable UL/DL configuration.

* * * * *